United States Patent [19]
Hachenburg

[11] 3,891,804
[45] June 24, 1975

[54] ASYNCHRONOUS DATA TRANSMISSION ARRANGEMENT

[75] Inventor: Victor Hachenburg, Naperville, Ill.

[73] Assignee: Bell Telephone Laboratories, Incorporated, Murray Hill, N.J.

[22] Filed: Sept. 12, 1973

[21] Appl. No.: 397,122

[52] U.S. Cl. .............................. 179/15 AL; 178/50
[51] Int. Cl. .............................. H04j 3/08
[58] Field of Search .................. 179/15 BA, 15 AL; 178/58 R, 50

[56] References Cited

UNITED STATES PATENTS

| | | | |
|---|---|---|---|
| 3,456,242 | 7/1969 | Lubkin et al. | 179/15 AL X |
| 3,643,030 | 2/1972 | Sparrendahl | 179/15 AL X |
| 3,751,595 | 8/1973 | Moses | 179/15 AL |
| 3,803,405 | 4/1974 | Ohnsorge et al. | 179/15 AL |

*Primary Examiner*—Robert L. Griffin
*Assistant Examiner*—Aristotelis M. Psitos
*Attorney, Agent, or Firm*—K. H. Samples

[57] ABSTRACT

A data transmission arrangement is disclosed wherein messages consisting of a synchronization code field, a destination terminal code field, a source terminal code field with sufficient bit capacity for both a source terminal code and a synchronization code, and a data field are transmitted between a plurality of transmission node terminals which are serially connected in a closed, asynchronous data transmission loop. Each node terminal contains a control circuit and a plurality of shift registers which the control circuit selectively connects in series with the data transmission loop to receive or to transmit the various fields of a message. In receiving a message only those shift registers of the receiving node terminal which are necessary to receive the synchronization code and the destination terminal code for the message are initially connected in series with the transmission path. If the message is not intended for the particular node terminal, no additional shift registers are employed and the message passes through the node terminal with only the message delay inherent in the use of the initially connected shift registers. If the message is intended for the node terminal, additional registers are employed to receive the remaining message fields. A message may be transmitted from a node terminal whenever the terminal determines that no message is currently being received. As a message is transmitted the control circuit removes shift registers from series connection in the data path as soon as possible to minimize possible transmission delay to messages received by the node terminal during the remainder of the message transmission. If during the transmission of a message from a node terminal, a message is received by that node terminal, it is shifted into whatever shift registers are currently connected in series with the data path and, thereafter, treated as any other received message.

8 Claims, 13 Drawing Figures

CONTROL CIRCUIT STATE TRANSITION CHART

| CURRENT CONTROL STATE \ SIGNALS | $Y_1=1$ | $Y_2=1$ | $Y_3=1$ | $Y_4=1$ | $Y_5=1$ | $Y_6=1$ | $Y_7=1$ | $\overline{M}=1$ | $M=1$ | SEND = 1 | RCV = 1 |
|---|---|---|---|---|---|---|---|---|---|---|---|
| 1011 | 1010 | 0011 | | | | | | | | | |
| 1010 | | | | | | | | | 1011 | 1110 | |
| 0111 | | | | | | | 0101 | | | | |
| 0101 | | | | | 0100 | | | | | | |
| 0110 | | | | | | | | 0010 | | | |
| 0010 | | | | | | | | | 0110 | 1010 | 1010 |
| 1110 | | | 1100 | 1111 | | | | | | | |
| 1111 | | 0111 | | | | 1011 | | | | | |
| 1100 | | | | | 0100 | | | | | | |
| 0011 | | | 0111 | | | | | | | | |
| 0100 | | | | | 0110 | | | | | | |

| CONTROL STATES | GATING SIGNALS FROM CONTROL CIRCUIT $X_1$ | $X_2$ | $X_3$ | $X_4$ | $X_5$ | $X_6$ | $X_7$ | $X_8$ | $X_9$ |
|---|---|---|---|---|---|---|---|---|---|
| 1011 | 0 | 1 | 0 | 0 | 0 | 0 | 1 | 0 | 0 |
| 1010 | 0 | 1 | 0 | 0 | 0 | 0 | 1 | 0 | 0 |
| 0111 | 0 | 0 | 1 | 0 | 0 | 0 | 0 | 0 | 1 |
| 0101 | 1 | 0 | 0 | 0 | 0 | 0 | 0 | 0 | 0 |
| 0110 | 0 | 0 | 0 | 1 | 0 | 0 | 0 | 0 | 0 |
| 0010 | 0 | 0 | 0 | 1 | 0 | 0 | 0 | 0 | 0 |
| 1110 | 1 | 0 | 0 | 0 | 1 | 1 | 0 | 0 | 1 |
| 1111 | 0 | 1 | 0 | 0 | 0 | 1 | 0 | 0 | 1 |
| 1100 | 1 | 0 | 0 | 0 | 0 | 0 | 0 | 1 | 1 |
| 0011 | 0 | 0 | 1 | 0 | 0 | 0 | 0 | 0 | 1 |
| 0100 | 0 | 0 | 0 | 1 | 0 | 0 | 0 | 0 | 0 |

ASYNCHRONOUS DATA TRANSMISSION ARRANGEMENT

BACKGROUND OF THE INVENTION

1. Field of the Invention

This invention relates to digital transmission arrangements and, more particularly, to loop digital transmission arrangements wherein serial data signals are transmitted between a plurality of terminals.

2. Description of the Prior Art

Numerous digital transmission arrangements for transmitting data between a plurality of data sources have been proposed in recent years. For example, in one system, exemplary of many systems known in the prior art, a number of access stations are connected in a data transmission loop which employs one special station to provide synchronization and regeneration of transmitted signals. In transmitting a message between access stations, the originating access station inserts the standard length message in a vacant, but preestablished, message block. The message block includes a synchronization code field, a destination code field, a source code field, and a plurality of data fields of limited bit length. The entire message is shifted through shift registers in each access station electrically interposed between the originating access station and the destination access station even though the message is not intended for those stations. When the message is received by the destination station, it is removed from the message block; the block is marked with a vacant code making the block available for use in transmitting another message. It is important to note, however, that a message cannot be transmitted by an access station until a vacant message block is detected. The message blocks are typically long compared to the address fields and thus, a station may have to wait a considerable time before it is able to transmit a message.

Such an arrangement as that just described from the prior art is effective to infrequently transmit large blocks of data between access stations, particularly where all access stations completely fill substantially all data fields of every message block. Where, however, some of the sources of data require infrequent transmission of large amounts of data and other sources require frequent transmission of small amounts of data, the arrangement described above wastes time on the transmission paths and this tends to cause the data sources to needlessly wait excessively long periods to gain access to the transmission loop.

SUMMARY OF THE INVENTION

A data transmission arrangement is provided in which a plurality of transmission terminals are connected in series in a unidirectional data transmission loop. According to this invention, each transmission terminal comprises means for monitoring data signals received by the respective terminal to separate messages directed to the respective transmission terminal from messages directed to other transmission terminals. In addition, each terminal further comprises means for transmitting on the transmission loop with a minimum of delay incoming data signals of messages directed to other terminals and means for initiating the transmission of messages originating with the respective transmission terminal at any time a data message is not being received by the respective transmission terminal.

Specifically, in one illustrative embodiment of applicant's invention each transmission terminal contains a shift register which is connected to receive data signals from the transmission loop and a detector for detecting the presence of a predefined synchronization code in the aforementioned shift register. Detection of the synchronization code is used to indicate that a message is being received. In addition, each transmission terminal contains a control circuit comprising means responsive to the detection of the reception of a message to generate control signals for gating the received data signals to the input of a selected one of a plurality of shift registers of the respective transmission terminal. Means are provided to determine if the message being received is intended for the particular transmission terminal. The control circuit further comprises means responsive to a determination that the message is not intended for the respective transmission terminal to generate control signals for gating the data signals appearing at an output of the selected shift register to a means for transmitting the data signals on the transmission loop. In addition, the control circuit also comprises means for determining when an entire message has been received. Such a determination is used to enable the respective transmission terminal to transmit a message of its own origination on the loop. If transmission of an original message is not complete when a message is received by the originating terminal, the received message is delayed sufficiently to prevent interference.

DETAILED DESCRIPTION OF THE ILLUSTRATIVE EMBODIMENT

Figure 1:
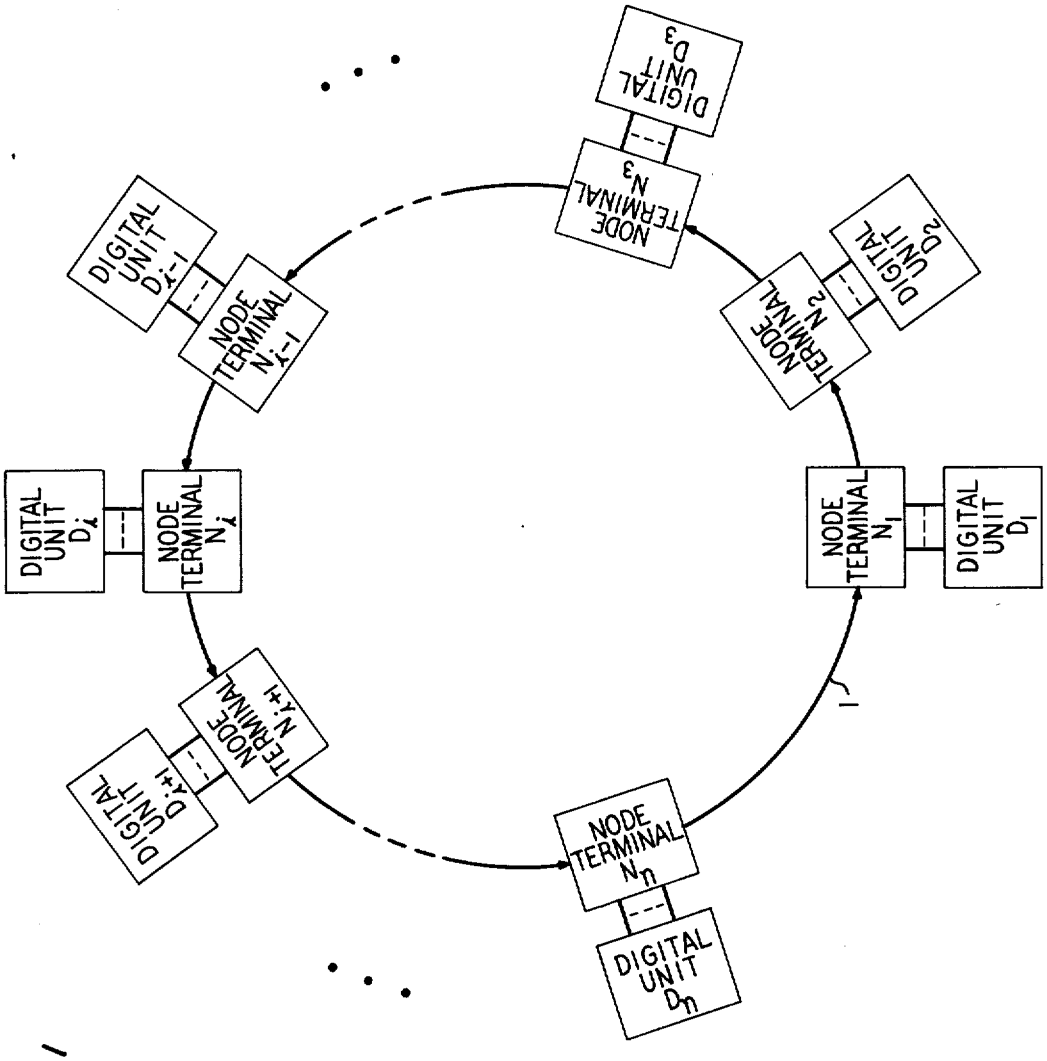
FIG. 1 shows a block diagram representation of a data communication arrangement employing applicant's invention.

A data transmission arrangement suitable for employing applicant's invention is shown in FIG. 1. The plurality of node terminals $N_1$ through $N_n$ are serially connected by the unidirectional, data transmission loop 1. Individually connected to each of the node terminals N is a digital unit $D_1$ through $D_n$, respectively. The particular digital units D used are not important to this invention. They may be, for example, a digital computer, a disk file store, a digital computer drum memory, or perhaps another type of data source which requires, from time to time, communication with other digital units in the transmission arrangement. Therefore, discussion of the characteristics of the digital units will be limited to the particular requirements for interfacing with the illustrative embodiment of a node terminal which is discussed in detail below. Initially, however, a general discussion of the characteristics of an illustrative node terminal will be presented. Thereafter, the detailed discussion of the specific illustrative node terminal will be presented.

Node Terminal — General Discussion

Figure 2:
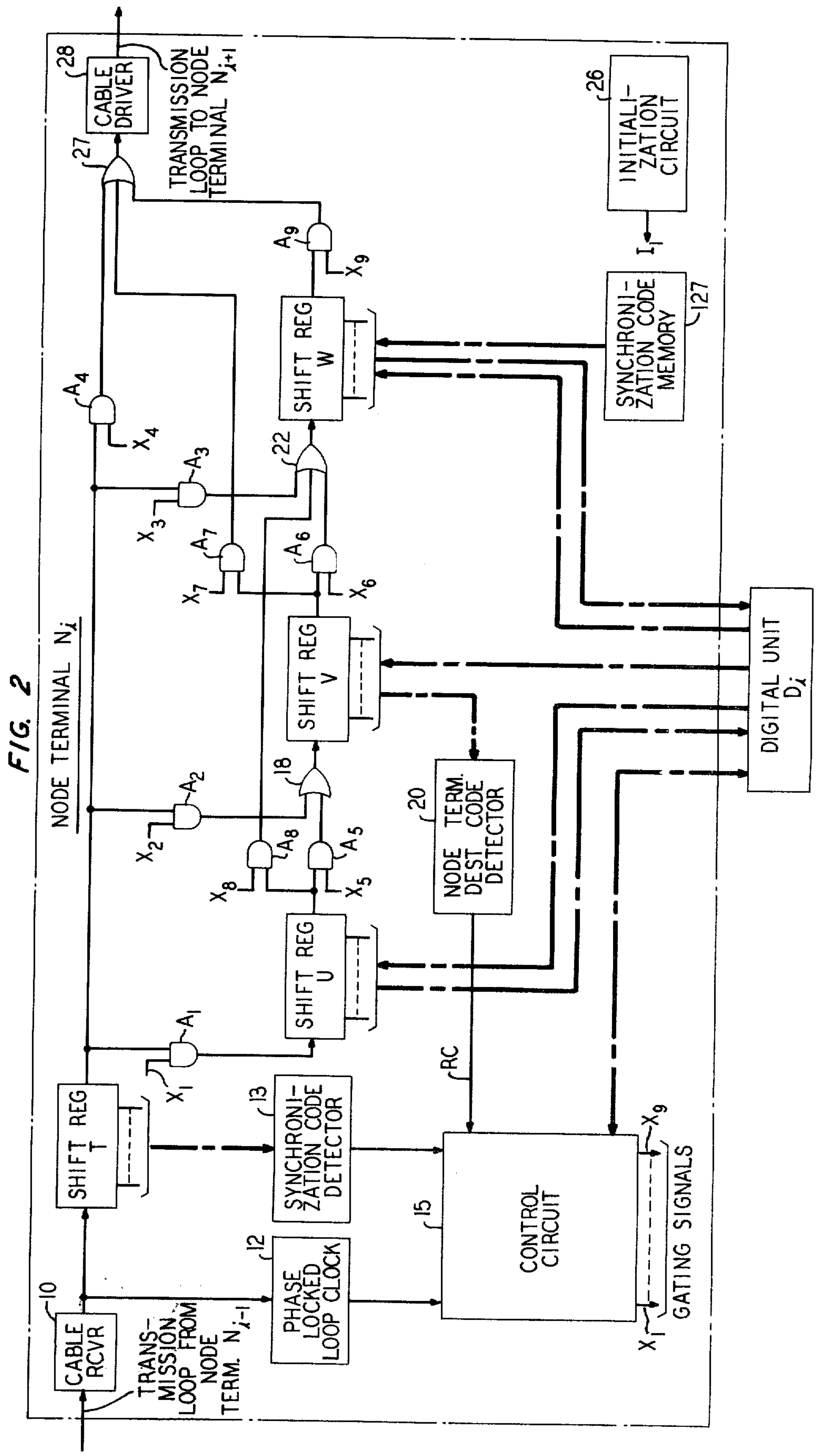
FIG. 2 shows a block diagram representation of the node terminal $N_i$ and the digital unit $D_i$ shown in FIG. 1.

A general block diagram representation of a typical, illustrative node $N_i$ is shown in FIG. 2. Signals received on the transmission loop from the node terminal $N_{i-1}$ are passed by the cable receiver 10, which may be merely an impedance matching circuit, to the shift register T. Thus, all signals received by the node terminal $N_i$ are shifted through the shift register T which, as will be seen, is used in detecting the reception of a message. It is at the outset important to note that, depending upon the gating signals $X_1$ through $X_9$ generated by the control circuit 15, signals appearing at the output of shift register T are gated by the AND gates $A_1$ through $A_9$ to the shift register U, the shift register V, shift register W, or to the cable driver 28. This selective gating of signals received on the transmission loop 1 (FIG. 1) provides the previously mentioned reduction in message transmission delay resulting from node terminals intervening between the source node terminal and the destination node terminal for a message.

Figures 3, 5, 8:
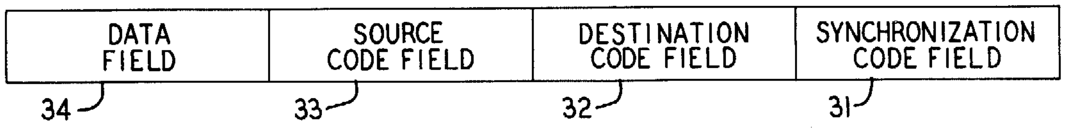
FIG. 3 shows a representation of the message format for the data transmission arrangement shown in FIG. 1.
FIG. 5 shows a table of gating signals produced by the control circuit shown in FIG. 2.
FIG. 8 shows a state transition chart for the control circuit shown in FIG. 6.

Prior to a more detailed discussion of the node terminal $N_i$ (FIG. 2), however, it is first necessary to consider the format of the messages transmitted by the node terminals N over the transmission loop 1 (FIG. 1). Specifically, FIG. 3 shows the format of one such message. It can be seen that the field 31 is the synchronization code field. As such, for each message it contains a synchronization code designed by methods well known in the prior art to synchronize the receiving node terminal N (FIG. 1) to an incoming message and assure that the beginning of a message is properly recognized or detected by the node terminal N receiving it. The field 32 (FIG. 3) is the destination code field. This field in a message contains a destination code uniquely identifying the node terminal N (FIG. 1) for which the message is intended. Thus, when a message is received by a node terminal, the terminal need only check the contents of the destination code field 32 (FIG. 3) to determine if it is the node terminal N (FIG. 1) for which the message is intended. Since the field 32 (FIG. 3) is the first information field of a message, the entire message need not be received before this determination can be made. The importance of this characteristic of the message format will become apparent below.

The source code field 33 (FIG. 3) in a message transmitted on the loop 1 (FIG. 1) contains a source code uniquely identifying the node terminal N in which the message originated. The source code field 33 (FIG. 3) is, however, of sufficient bit capacity to include not only the source code of the originating node terminal N (FIG. 1) but also the synchronization code contained in the field 31 (FIG. 3). It should be noted, however, that in every message a synchronization code actually appears only in the field 31 and never in the field 33. It is sufficient here to note that the field 33 is merely of sufficient bit capacity to include the synchronization code as a separate code from the source code.

Finally, the field 34 is the data field. As such, it contains the useful data which is desired to be transmitted from one node terminal N (FIG. 1) to another by the message.

With the above understanding of the message format employed in transmitting information from one node terminal N (FIG. 1) to another, attention is again turned to FIG. 2 and the typical node terminal $N_i$ represented therein. It was mentioned above that the selective gating of signals received on the transmission loop 1 (FIG. 1) to the registers U, V, and W (FIG. 2) or to the cable driver 28 is controlled by the gating signals, specifically signals $X_1$ through $X_9$ generated by the control circuit 15. A detailed discussion of a control circuit 15 suitable for use in node terminal $N_i$ will be presented subsequently. For the immediate discussion, however, reference will be made to FIG. 4 wherein a generalized transition state diagram for the control circuit 15 is presented. The states are identified by four bit binary codes. These codes will assume added significance in the detailed discussion of the control circuit 15 which follows. However, for now it is sufficient that they each uniquely identify a control state. The symbolic representations within each control state circle describe the gating of received signals appearing at the output of the shift register T (FIG. 2) through the respective shift registers U, V, and W. For example, in control state 1011 (FIG. 4) signals appearing at the output of shift register T are gated to the shift register V input and signals appearing at the shift register V output are gated to the transmission loop (FIG. 2). In addition, the table shown in FIG. 5 shows the logical values of each of the above mentioned gating signals $X_1$ through $X_9$ generated by the control circuit 15 (FIG. 2) in each of its control states.

It is assumed for purposes of illustration that the node terminal $N_i$ (FIG. 2) is in the control state 1011 (FIG. 4) and that a message is being received at the input of the cable receiver 10 (FIG. 2). As the digits of the message appear at the output of the cable receiver 10, they are applied to the shift register T and to the phase locked loop clock 12. The phase locked loop clock 12 is of a type well known in the prior art. See D. J. Jones, "Introduction to the Phase-Locked Loop," *Electronic Products*, Oct. 16, 1972, pages 69–75; A. B. Grebene, "The Monolithic Phase Locked Loop: A Versatile Building Block," *EDN*, October, 1972, pages 26–31. The output signals of the clock 12 occur at a frequency dependent upon a reference frequency with a variation about that reference frequency determined by an estimate of the clock frequency of the signals applied to the input of the clock 12. It is this output of the clock 12 which is used to shift signals appearing at the output of the cable receiver 10 into the shift registers T, U, V, and W, respectively. It should be noted here that any serial storage means which operates in the nature of a shift register could be used for what are herein referred to, simply, as shift registers.

The digits applied to the shift register T are sequentially shifted into the register T in response to the signals at the output of the clock 12. It should be noted that the register T has a number of register stages equal to the number of bits in the synchronization code field 31 (FIG. 3). Thus, after a number of clock cycles equal to the number of bits in the synchronization code field 31, the entire synchronization code field 31 has been shifted into and fills the register T (FIG. 2). The synchronization code detector 13 then generates a signal which is applied to the control circuit 15. This signal is used internally by the control circuit 15 to indicate that the reception of a message has been detected. The signal generated by the detector 13 does not change the state of the control circuit 15, however. Thus, the circuit 15 remains in the state 1011 (FIG. 4).

Referring to FIG. 5, for the control state 1011 it can be seen that only the gating signals $X_2$ and $X_7$ are equal to 1, all other gating signals being equal to 0. As a result, of the AND gates $A_1$ (FIG. 2) through $A_9$, only the outputs of the AND gates $A_2$ and $A_7$ are enabled to respond to signals applied to the respective other inputs of the gates $A_2$ and $A_7$. Consequently, when the signals shifted through the shift register T appear at the output of the register T and are applied to the AND gates $A_1$, $A_2$, $A_3$, and $A_4$, only the AND gate $A_2$ is enabled to pass the signals to its output.

The signals appearing at the output of the AND gate $A_2$ (FIG. 2) are applied through the OR gate 18 to the shift register V. Again, in accordance with the clock signals from the clock 12, signals appearing at the input of the shift register V are shifted into that register. The shift register V has a number of register stages equal to the number of data bits in the synchronization code field 31 (FIG. 3) and the destination code field 32. Thus, after a number of clock cycles equal to the number of bits in the message synchronization code field 31 and the destination code field 32, the destination code field 32, preceded by the synchronization code field 31, should have been shifted into the register V (FIG. 2). The control circuit 15 then monitors the output signal of the node terminal destination code detector 20 to determine if the shift register V contains the destination code uniquely associated with the node terminal $N_i$. It is important, however, to note here that since the shift register V contains a number of stages equal to the number of bit positions in the fields 32 (FIG. 3) and 31, the entire synchronization code contained in the field 31 is stored in the shift register V (FIG. 2). Thus, the synchronization code for this message has not been transmitted yet to the node terminal $N_{i+1}$.

Figure 4:
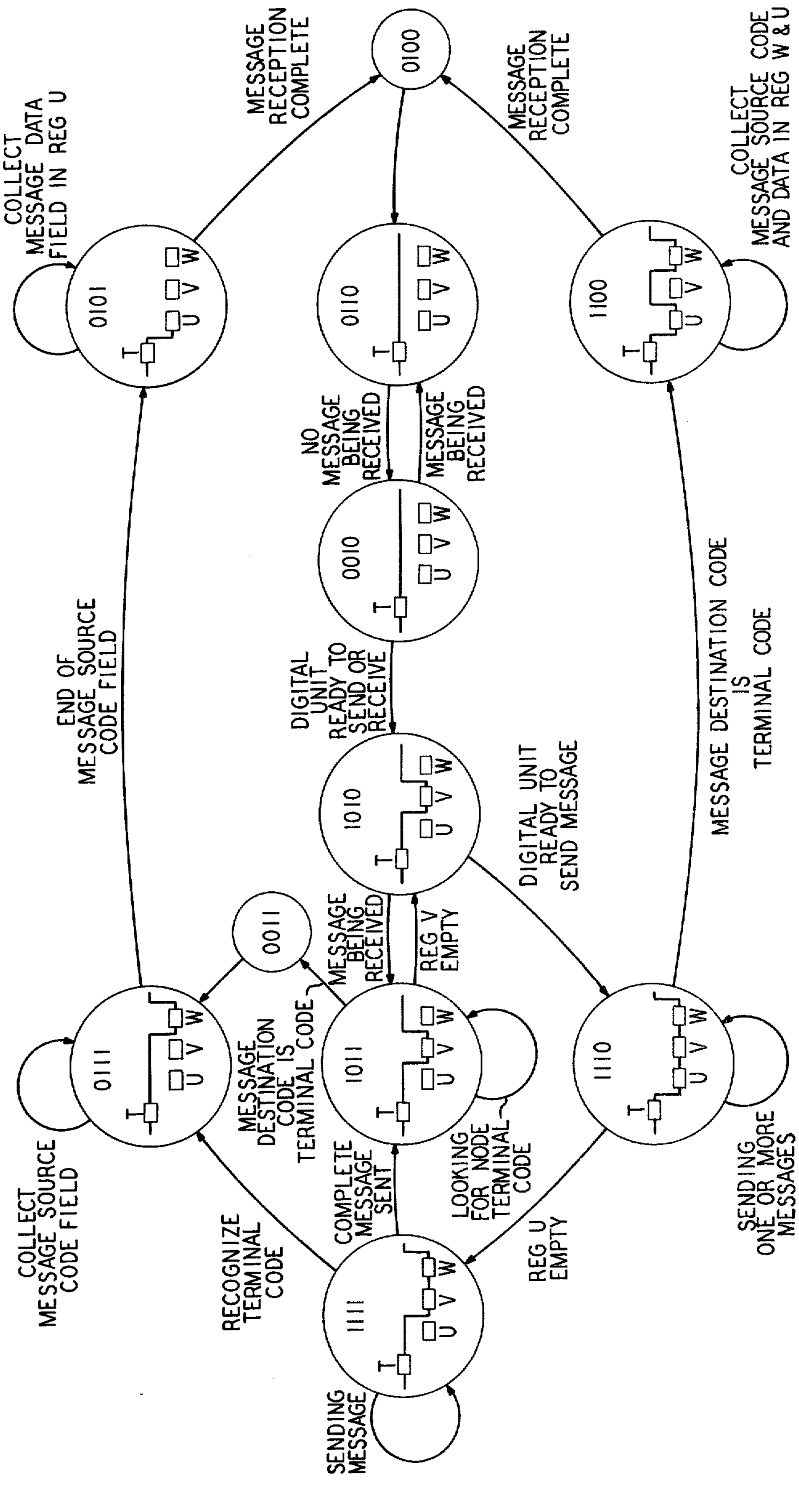
FIG. 4 shows a general state transition diagram for the control circuit shown in FIG. 2.

If, at this point the output signal from the detector 20 indicates that the register V does contain the code for the node terminal $N_i$, the control circuit 15 changes its control state to the transitional control state 0011 (FIG. 4). More specifically, the control circuit 15 (FIG. 2) changes its control state to the transitional control state 0011 (FIG. 4) in response to the recognition that the message being received is intended for the node terminal $N_i$. Consequently, the remaining portions of the message must be collected in the appropriate shift registers.

As the name implies, the transitional control state 0011 (FIG. 4) exists only to provide a transitional path between the states 1011 and 0111 for timing reasons. Therefore, immediately upon changing its control state to 0011, the control circuit 15 (FIG. 2) continues to change its control state once again to the control state 0111 (FIG. 4). Referring to FIG. 5 it can be seen that in the control state 0111 only the gating signals $X_3$ and $X_9$ are equal to 1, all other gating signals being equal to 0. Consequently, of the AND gates $A_1$ through $A_9$ (FIG. 2) only the outputs of the AND gates $A_3$ and $A_9$ are enabled to respond to signals applied to the respective other inputs of those gates. As a result, signals subsequently appearing at the output of the shift register T no longer are gated through the AND gate $A_2$ to the OR gate 18, but rather, are gated through the AND gate $A_3$ to the OR gate 22 and applied to the input of the shift register W. The shift register W serves to receive the source code field 33 (FIG. 3) of the incoming message. The register W (FIG. 2) has a number of register stages, equal to the number of bit positions in the source code field 33 (FIG. 3). Thus, after a sufficient number of clock intervals for the entire source code field 33 to have been collected in the shift register W (FIG. 2), the control circuit 15 changes to the control state 0101 (FIG. 4) on the assumption that the entire message source code field is now stored in the shift register W (FIG. 2).

In the control state 0101 (FIG. 4) as can be seen in FIG. 5, only the gating signal $X_1$ is equal to 1, all other gating signals being equal to 0. As a result, subsequent signals appearing at the output of the shift register T (FIG. 2) are gated by the AND gate $A_1$ to the input of the shift register U. The shift register U is used to receive the data field 34 (FIG. 3) of the incoming message. After a sufficient number of clock intervals that the entire data field 34 should have been shifted into the shift register U (FIG. 2), control circuit 15 considers message reception completed for this particular message. The state of the control circuit 15, therefore, changes to the transitional control state 0100 (FIG. 4) and, therefrom, immediately to the control state 0110. Simultaneously, the control circuit 15 (FIG. 2) signals the digital unit $D_i$ that a message has been received and should be accessed from the registers U and W. As a result, the digital unit accesses the registers U and W for the purpose of acquiring the data field 34 (FIG. 3) and source code field 33 stored therein.

In the immediately preceding discussion it was assumed that the destination code contained within the destination code field 32 of the incoming message was the code for the node terminal $N_i$ (FIG. 2). As a result, the initially assumed control state 1011 (FIG. 4) of the control circuit 15 (FIG. 2) was changed through the transitional control state 0011 (FIG. 4) to the control state 0111. If, however, the code contained in the destination code field 32 (FIG. 3) of the incoming message had not been the code for the node terminal $N_i$ (FIG. 2), the state of the control circuit 15 would not have changed until the entire incoming message had been shifted through the register V and that register was empty. More specifically, when the control state of the circuit 15 is the 1011 (FIG. 4) state and a message having a destination code not that of the node terminal $N_i$ is received, that control state is maintained together with the state of the gating signals to the AND gates $A_1$ (FIG. 2) through $A_9$ until the remaining bits of the incoming message have been shifted through the register V and back out to transmission loop (FIG. 2) by way of the enabled AND gate $A_7$, the OR gate 27, and the cable driver 28. Thus, since the received message is not intended for the node terminal $N_i$, no unnecessary shift registers are inserted in series with the message bit stream and message transmission delay through the node terminal $N_i$ is minimized.

It will be recalled that earlier, upon the completion of reception of a message which was, in fact, intended for the node $N_i$, control circuit 15 (FIG. 2) assumed the control state 0110 (FIG. 4) and signalled the digital unit $D_i$ (FIG. 2) to access the data stored in the registers U and W. In order for the control circuit 15 to reach the next control state (FIG. 4), namely control state 0010, there must be no message being received by the node terminal $N_i$ (FIG. 2). As was mentioned above, the presence of an incoming message is indicated by the detection of a synchronized code by the synchronization code detector 13. If, then, the synchronization code detector 13 has not detected a synchronization code since completion of reception of the last message, the control circuit 15 transitions from the control state 0110 (FIG. 4) to the control state 0010. When the digital unit $D_i$ (FIG. 2) signals the control circuit 15 that it is ready to send or to receive another message, the control circuit assumes the control state 1010 (FIG. 4).

It should be noted from FIG. 5, however, that during the time the control circuit 15 (FIG. 2) is in the control state 0110 (FIG. 5) or the control state 0010, only the gating signal $X_1$ is equal to 1, all other gating signals being equal to 0. As a result, when the control circuit 15 (FIG. 2) is in either of these states, the only delay which the node terminal inserts in the transmission path for messages is the delay due to the shift register T. Moreover, the control circuit 15 will continue to cycle between these two control states with the detection of and the completion of the reception of messages until the digital unit $D_i$ signals that it is ready to send or receive a message. Throughout such a period the message delay due to the node terminal $N_i$ is held to a minimum.

From the state 1010 (FIG. 4) the control circuit 15 (FIG. 2), upon the determination by the synchronization code detector 13 that a message is being received, makes the transition to the state 1011 (FIG. 4) for reception of that message, as above described. If, however, before the synchronization code detector 13 indicates that a message is being received, the digital unit $D_i$ signals the control circuit 15 that it is ready to send a message, the control state 1110 (FIG. 4) is assumed. Simultaneously, signals representing the appropriate node terminal destination code, the node terminal source code, and the data message are loaded into the registers W, V, and U (FIG. 2), respectively. It is important to note here that in addition to loading into the shift register W the code uniquely identifying the destination node terminal N (FIG. 1) for the message, the synchronization code is also appropriately loaded into the shift register W (FIG. 2) from the synchronization code memory 127. This is required to provide the message with the proper synchronization code when it is subsequently transmitted on the transmission loop 1 (FIG. 1).

In the control state 1110 (FIG. 5) the gating signals $X_1$, $X_5$, $X_6$, and $X_9$ are all equal to 1, all other gating signals being equal to 0. As a result, the outputs of the AND gates $A_1$, $A_5$, $A_6$, and $A_9$ (FIG. 2) are all enabled to respond to signals applied to the respective other inputs of those gates. Consequently, the signals stored in the shift register W are shifted out of the register W and are applied through the gate $A_9$ and the OR gate 27 to the cable driver 28. Similarly, the signals stored in the shift register V are shifted out of the register V and are applied to the input of the shift register W by way of the AND gate $A_8$ and the OR gate 22. Signals stored in the shift register U are similarly applied through the AND gate $A_5$ and the OR gate 18 to the input of the shift register V. After a sufficient number of clock intervals, the entire message originally loaded into the shift registers U, V, and W has been applied serially through the cable driver 28, to the data transmission loop (FIG. 2).

It should be noted, however, that it is possible that during the transmission of the message loaded from the digital unit $D_i$ into the registers U, V, and W a message may be received by the terminal $N_i$. As described above, the reception of a message is indicated by the generation of a signal from the synchronization code detector 13. If such a signal should be generated prior to shifting the entire message data field originally stored from the digital unit $D_i$ in the register U into the register V, the control state of the control circuit 15 (FIG. 2) is maintained constant until a sufficient number of bits of the new message have been shifted through the registers U and V to determine if the message is intended for the node terminal $N_i$. This is, of course, indicated by the destination code in the message being the terminal code for the node terminal $N_i$. If the destination code and terminal code are the same, the control circuit 15 transitions from the control state 1110 (FIG. 4) to the control state 1100 in which only the gating signals $X_1$, $X_8$, and $X_9$ (FIG. 5) are equal to 1.

When the control state 1110 (FIG. 4) is assumed, the destination code field 32 (FIG. 3) and synchronization code 31 for the message are already stored in the shift register V (FIG. 2). As a result, only the source code field 33 (FIG. 3) and the data field 34 of the message need be received and stored, respectively, in the shift registers W (FIG. 2) and U. Consequently, the previously mentioned gating signals enable a data path from the output of the register T through the AND gate $A_1$ to the input of the shift register U and from the output of the shift register U through the AND gate $A_8$ and the OR gate 22 to the input of the shift register W. It should be observed that during the shifting of the new message into the shift registers U and W, any portion of the previous message remaining in the shift register W is shifted from the shift register W through the AND gate $A_9$ and the OR gate 27 to the cable driver 28. Thus, the complete message previously stored in the registers U, V, and W when the control circuit 15 entered the state 1110 (FIG. 4) is properly transmitted and the new message being received is correctly stored in the appropriate registers.

When a sufficient number of clock cycles have occurred such that the entire new message should have been received, control circuit 15 (FIG. 2) assumes the previously mentioned transition control state 0100 (FIG. 4) and from there assumes the control state 0110, as described previously. The digital unit $D_i$ (FIG. 2) is simultaneously signalled that a message has been received and is stored in the registers U and W.

Returning to the discussion of the state 1110 (FIG. 4) it will be recalled that upon entry into this state a message is loaded into the registers U, V, and W (FIG. 2) from the digital unit $D_i$. Further, it will be recalled that while that message is being transmitted onto the transmission loop, a new message may be received. If such is the case and the new message contains a destination code which is the terminal code for the node terminal $N_i$, the control circuit 15 transitions to the control state 1100 (FIG. 4). If, however, the message destination code is not the terminal code for the terminal $N_i$ (FIG. 2), the control state 1110 (FIG. 4) is not changed. The new message is shifted into the U, V, and W registers connected in series and shifted again out of those registers back on to the transmission loop (FIG. 2).

When, however, no new message is received during the transmission of the message originally loaded upon entry into the state 1110 (FIG. 4) before the shift register U (FIG. 2) becomes empty, the control circuit 15 (FIG. 2) assumes the control state 1111 (FIG. 4). In the control state 1111 (FIG. 5) the gating signals $X_2$, $X_6$, and $X_9$ are equal to 1, all other gating signals being equal to 0. As a result, as can be seen in FIG. 4, a data path is created from the output of the shift register T (FIG. 2) through the enabled AND gate $A_2$ and the OR gate 18 to the input of the shift register V. From the output of the shift register V, the data path continues through the AND gate $A_6$ and the OR gate 22 to the input of the shift register W and, finally, from the output of the shift register W through the AND gate $A_9$ and the OR gate 27 to the cable driver 28.

As long as no new message is detected by the synchronization code detector 13 prior to the completion of transmission of the remainder of the message stored in the shift registers V and W, the control circuit 15 (FIG. 2) transitions from the control state 1111 (FIG. 4) to the previously described control state 1011 at the completion of transmission of that message. If, however, a new message is received during the transmission of the message stored in the shift registers V (FIG. 2) and W, the synchronization code field 31 (FIG. 3) and the destination code field 32 for the new message are shifted into the shift register V (FIG. 2). When the reception of the destination code field 32 (FIG. 3) for the message is completed, the received destination code is checked by the detector 20 (FIG. 2) to determine if it is the code for the node terminal $N_i$. If it is, the control circuit 15 transitions to the control state 0111 (FIG. 4) to complete the transmission of the preceding message and to collect the source code field 33 (FIG. 3) of the message being received. If, however, the destination code for the new message is not that of the node terminal $N_i$ (FIG. 2), the control state 1111 (FIG. 4) is maintained until the entire new message has been shifted through the shift registers V and W; whereupon, transition to the control state 1011 is warranted. The above has described the operation of the node terminal $N_i$ as it is shown in block diagram form in FIG. 2. It should be noted that the sequential control circuit 15 controls the operation of the node terminal $N_i$ in such a manner as to minimize the message delay to messages which the node terminal $N_i$ receives but which are not intended for the node terminal $N_i$. In addition, it should also be noted that the node terminal $N_i$ under the control of the control circuit 15 and upon a request from the digital unit $D_i$ is capable of transmitting a message whenever a message is not being received by the node terminal $N_i$ at the time transmission is to begin. If a message is received while the message is being transmitted, the control circuit 15 properly controls the gating of the message signals to the shift registers of the node terminal to ensure both the proper reception of the message and the minimization of message delay if the received message is determined to be intended for another node terminal N (FIG. 1).

Node Terminal — Detailed Discussion

Figures 6, 6A:
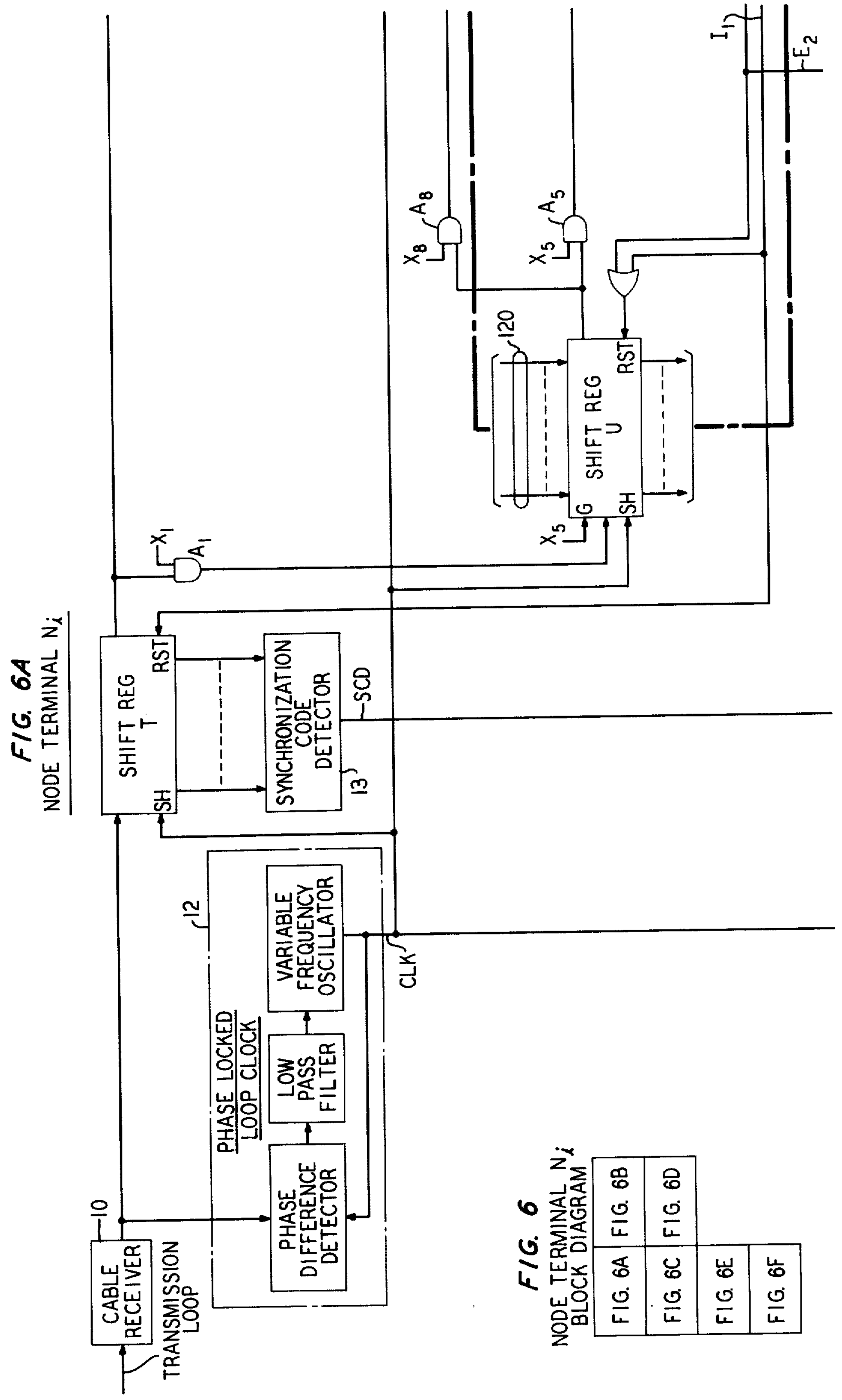
FIG. 6, including
FIG. 6A through 6F, shows a detailed schematic representation of the node terminal $N_i$ shown in FIG. 1 together with a general representation of the digital unit $D_i$ shown in FIG. 1.

Having above described the general operation of the node terminal $N_i$ (FIG. 2) and the digital unit $D_i$, attention is now turned to a discussion of the detailed representation of the typical node terminal $N_i$ and the representation of the digital unit $D_i$ as shown in FIG. 6, including FIG. 6A through 6F. It should be noted that the control circuit 15 is shown in considerable detail particularly in FIG. 6C, 6E, and 6F.

Figure 6B:
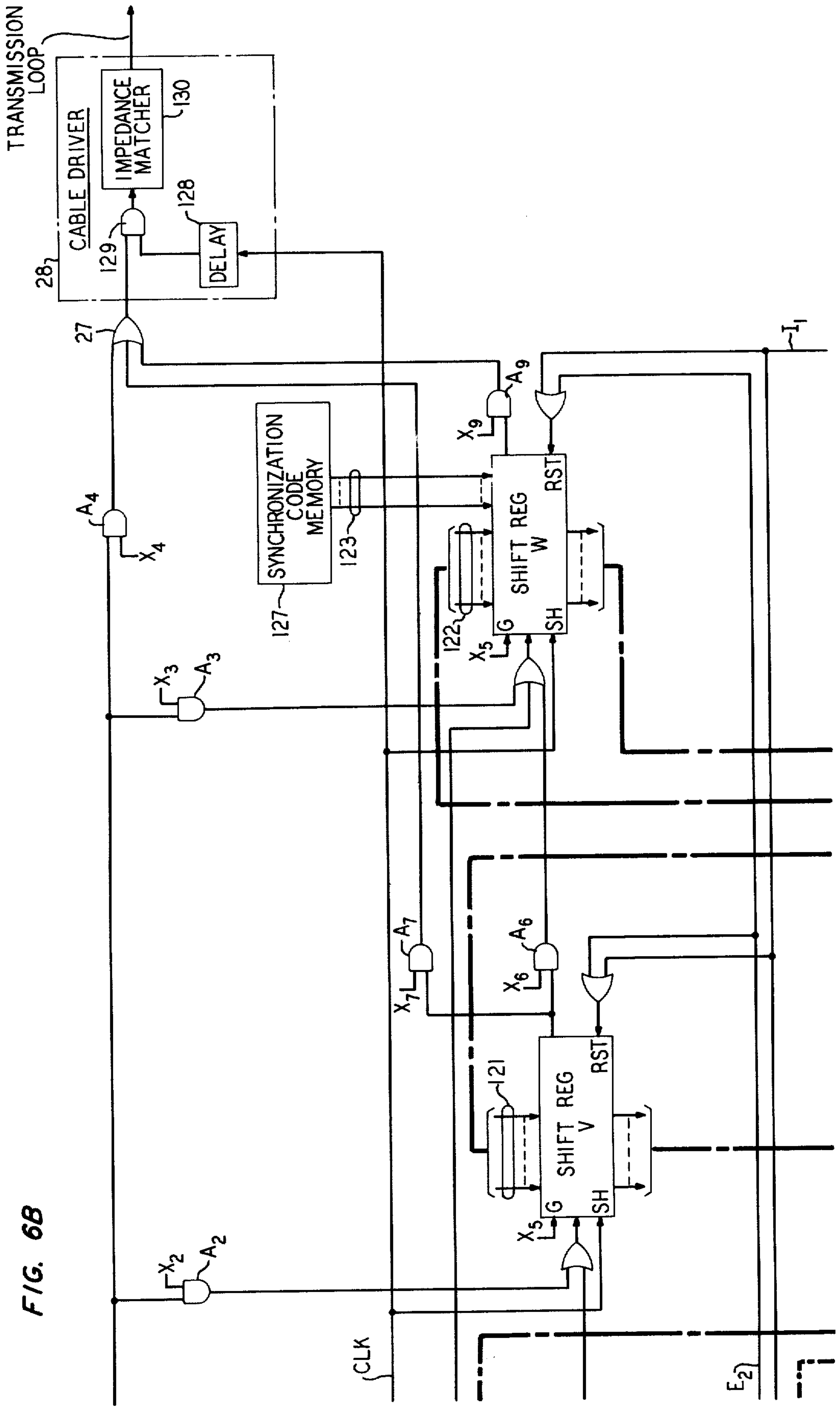
Figure 6C:
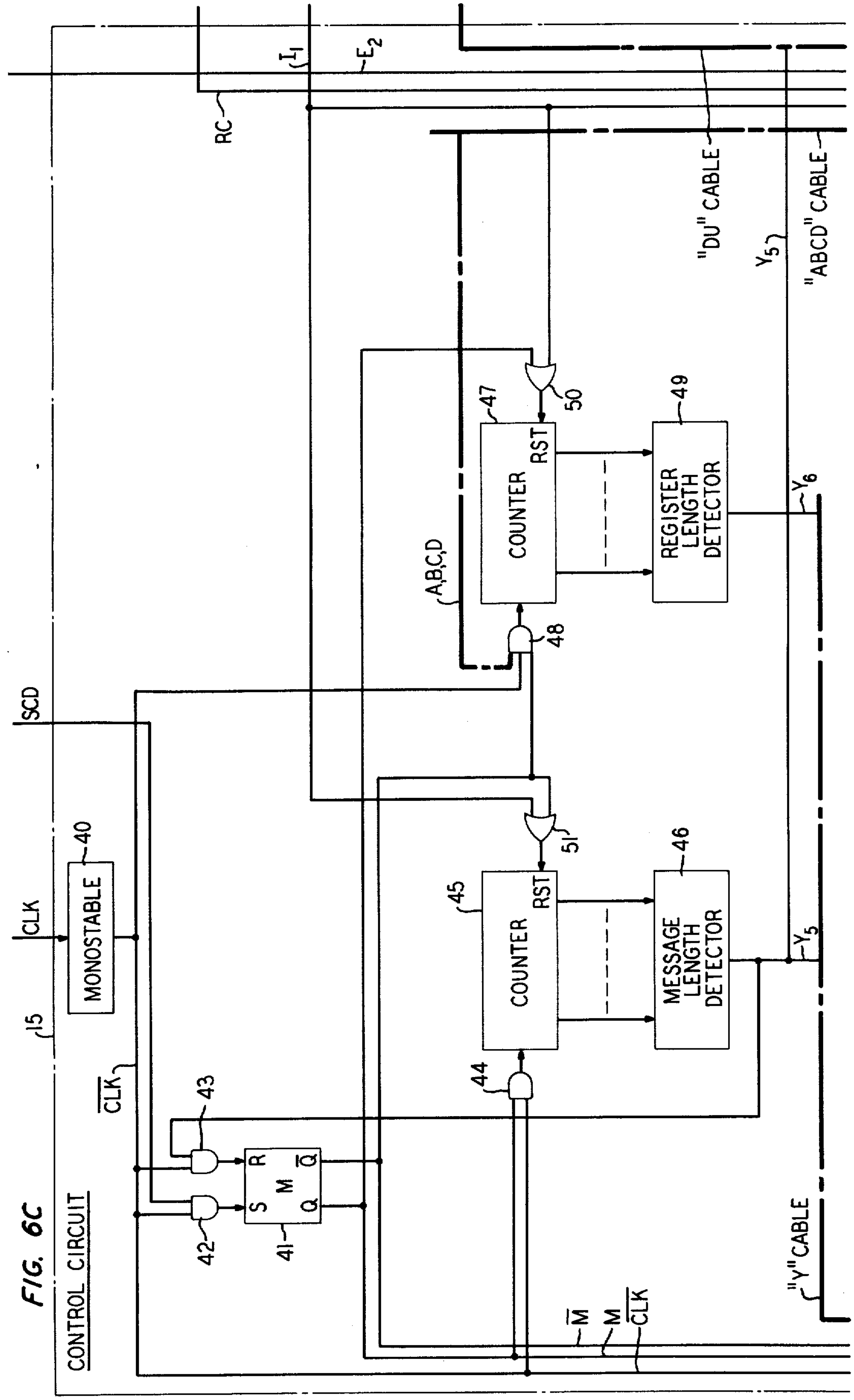
Figure 6D:
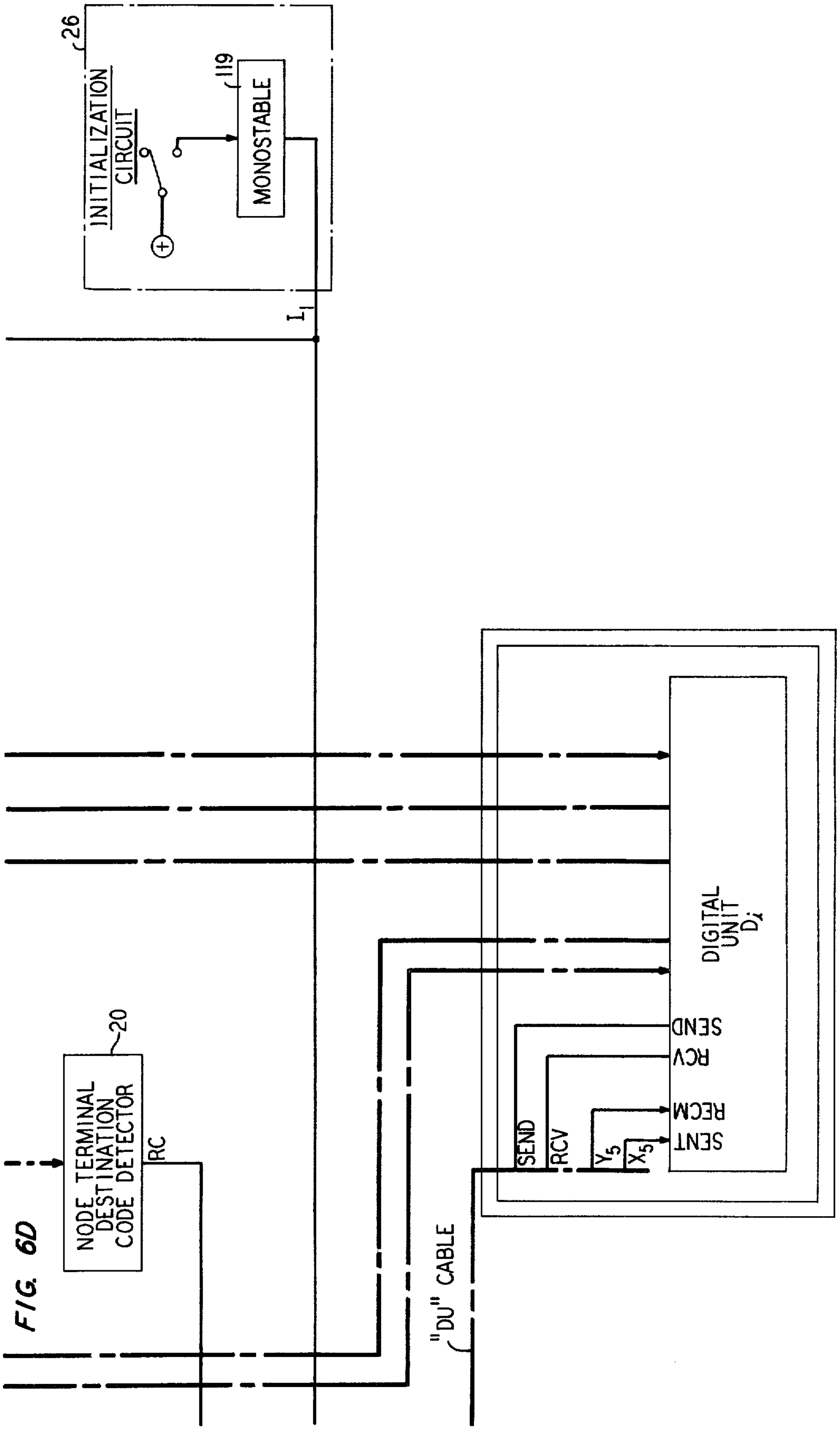
Figure 6E:
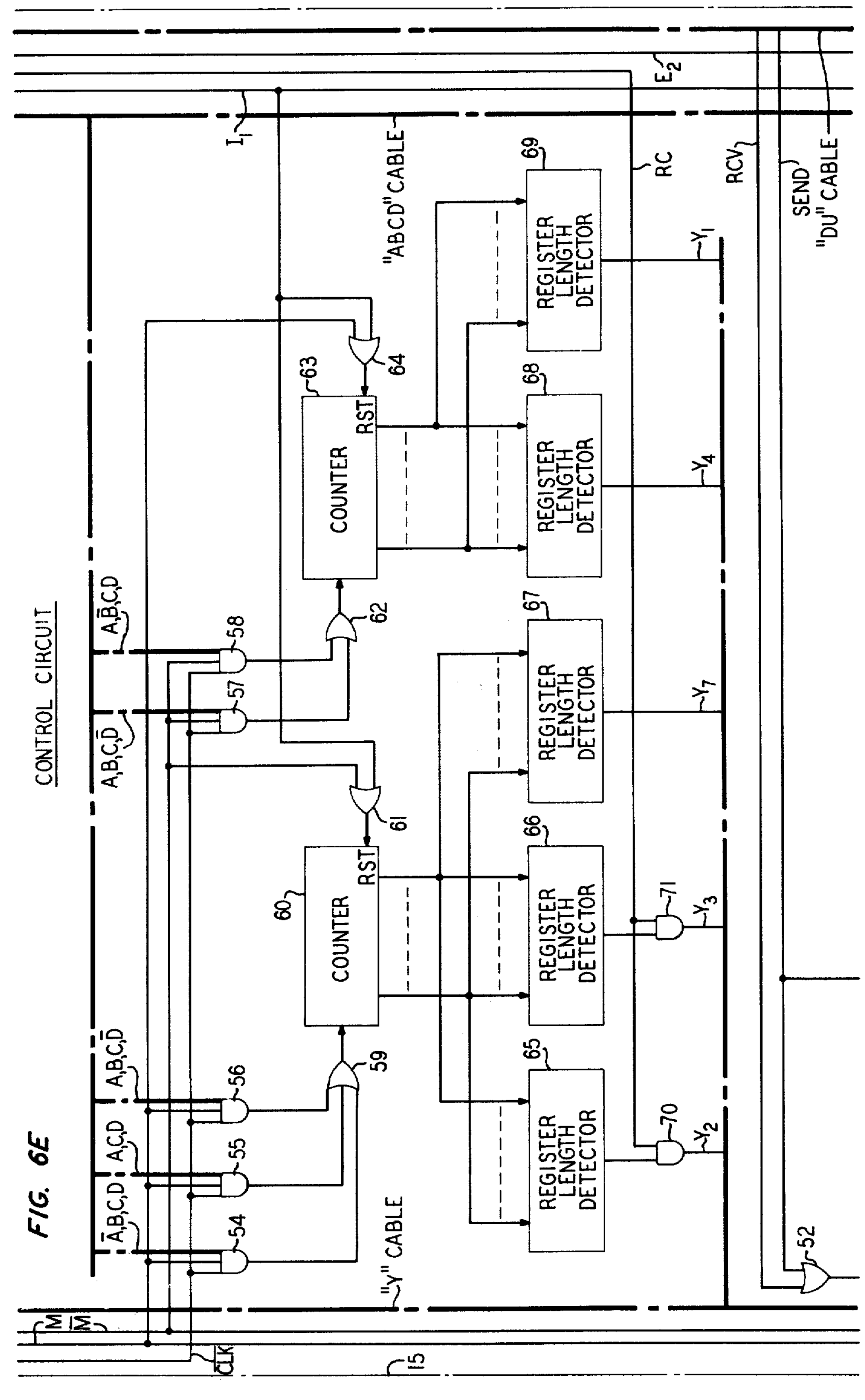
Figure 6F:
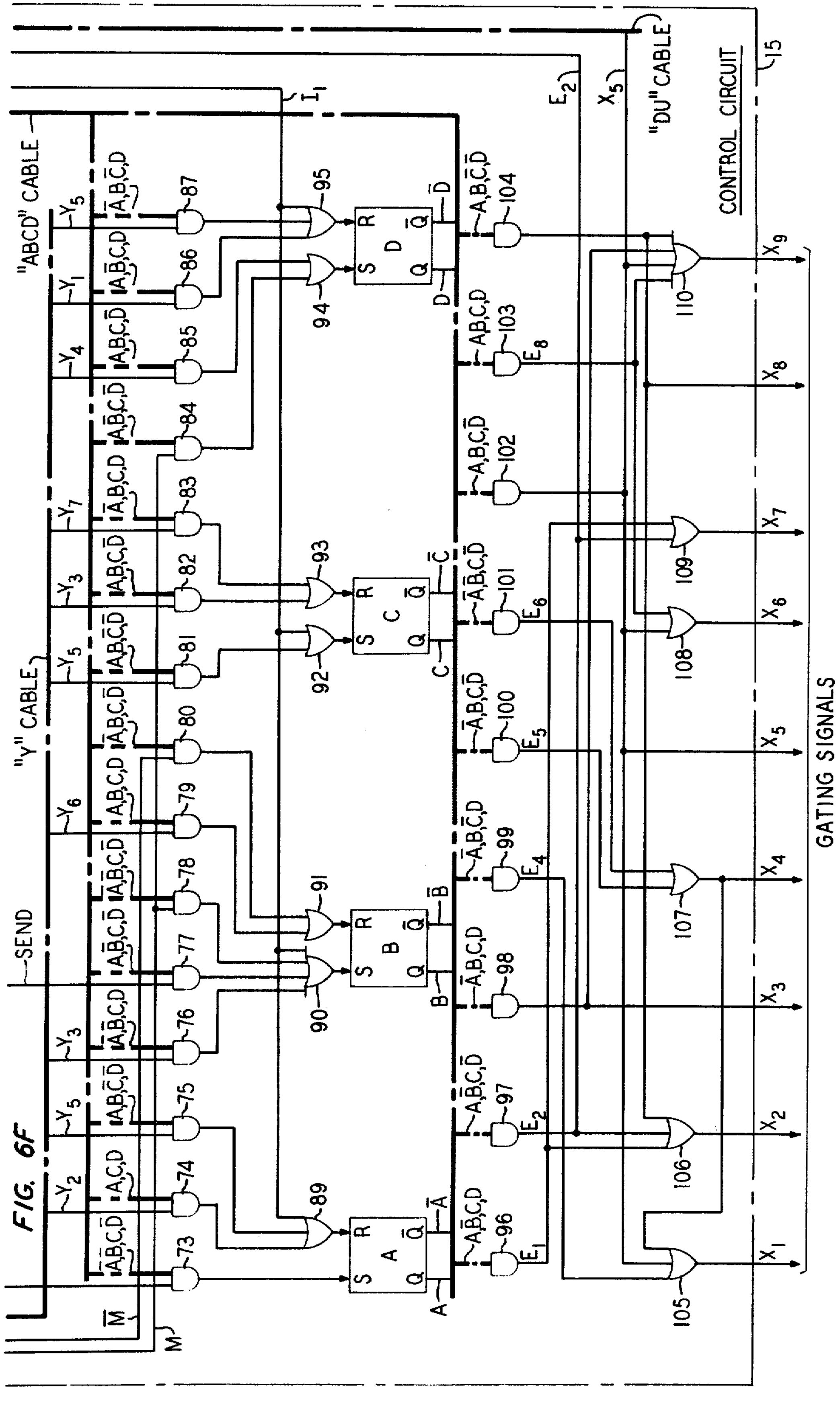
Figure 7:
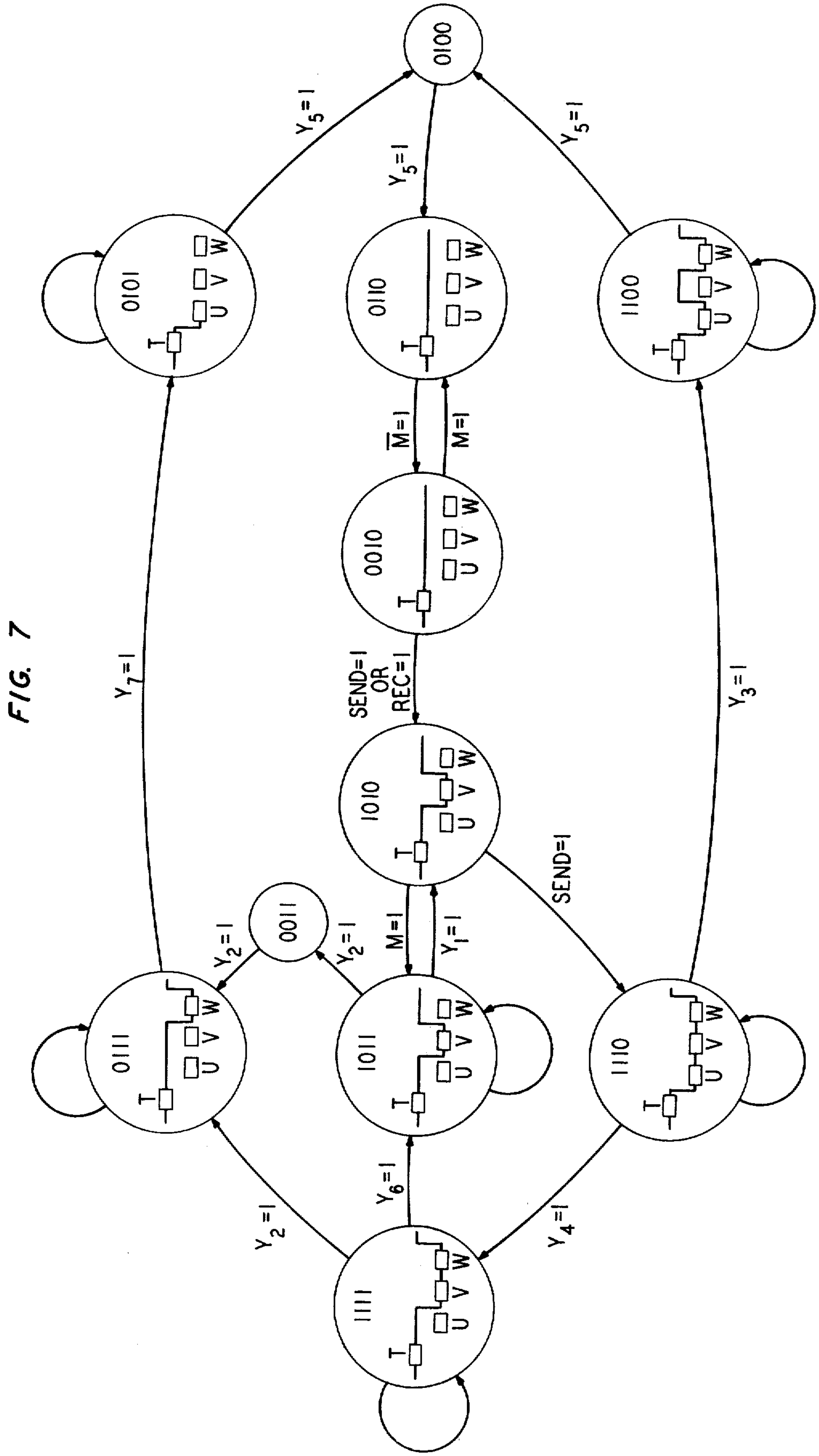
FIG. 7 shows a state transition diagram for the control circuit shown in FIG. 6.

It should first be noted that an initialization circuit 26 is provided in the node terminal $N_i$ (FIG. 6). The initialization circuit 26 (FIG. 6D) consists of a switch $S_1$ which, upon activation, applies a signal to a monostable 119. As a result, the monostable 119 generates a pulse signal $I_1$ equal to 1 which is applied as a reset signal to the shift registers T, U, (FIG. 6A) V, and W (FIG. 6B). That signal is also applied as a reset signal to the counter 45 (FIG. 6C) and the counter 47, through the OR gates 51 and 50, respectively. It is further applied as a reset signal to the counter 60 (FIG. 6E) and the counter 63 through the OR gates 61 and 64, respectively. It is finally applied as a set signal to the S inputs of the flip-flops B and C (FIG. 6F) through the OR gates 90 and 92, respectively, and as a reset signal to the R inputs of the flip-flops A and D through the OR gates 89 and 95, respectively. The application of this signal to the flip-flops A, B, C, and D as described initializes the control circuit 15 to the control state 0110 (FIG. 7). Thus, it can be seen that the bits of the four-bit binary code used to identify each control state correspond to the set/reset state of the flip-flops A, B, C, and D (FIG. 6F), respectively, which, in turn, determine the control state of the circuit 15.

It should also be noted that the signals corresponding to the Q and $\overline{Q}$ outputs of the flip-flop A are referred to in the discussion which follows respectively as A, $\overline{A}$. Similarly, the signals corresponding to the Q and $\overline{Q}$ outputs of the flip-flop B are referred to as B and $\overline{B}$, and so on.

Having initialized the control circuit 15 (FIG. 6) to the control state 0110, the node terminal $N_i$ is ready to transition to the control state 0010 in preparation for either a message send or receive operation. The transition to the state 0010 (FIG. 7) occurs when the flip-flop M (FIG. 6C) assumes the reset state. The reset state of the flip-flop M, as indicated by the signal $\overline{M}$ being equal to 1, occurs when no message is being received by the node terminal $N_i$. Stated in other terms, whenever there is an intermessage gap, a time period between message reception on the transmission loop 1 (FIG. 1), the flip-flop M (FIG. 6C) is reset by an output from the message length detector 46 which is applied through the AND gate 43 to the R input of the flip-flop M. The operation of the flip-flop M in conjunction with the message length detector 46 will be discussed in more detail subsequently.

Assuming for the moment that no message is being received and that the signal $\overline{M}$ is equal to 1, the control circuit 15 (FIG. 6) assumes the control state 0010 (FIG. 7). In this state, as was the case with the control state 0110, only the gating signal $X_4$ is equal to 1 (FIG. 5). As a result, signals received on the transmission loop (FIG. 6A) are shifted through the shift register T and, ultimately, applied to the transmission loop (FIG. 6B) by the cable driver 28. If a message should be received from the transmission loop (FIG. 6A) as indicated by the detection by the synchronization code detector 13 of the synchronization code, the flip-flop M in the control circuit 15 (FIG. 6C) becomes set. More specifically, upon detection of the synchronization code in the shift register T, the synchronization code detector 13 (FIG. 6A) generates the signal SCD = 1 which is applied to the AND gate 42 (FIG. 6C). The other input of the AND gate 42 is the signal $\overline{CLK}$ appearing at the output of the monostable 40. The signal $\overline{CLK}$ produced by the monostable 40 is equal to 0 for a period approximately equal to one-eighth of a clock period following the occurrence of a positive transition of the signal CLK. It is thereafter equal to 1 until the next positive transition of the clock signal CLK. Thus, the $\overline{CLK}$ signal may be thought of as an inverted clock signal CLK, with an altered duty cycle.

When the signal $\overline{CLK}$ becomes equal to 1 with the signal SCD already equal to 1, the output of the AND gate 42 becomes equal to 1 and the flip-flop M, to which the output of the AND gate 42 is applied, becomes set. It should be noted that the flip-flop M, once set, remains set, as above described, until the message length detector 46 applies the signal $Y_5 = 1$ to the AND gate 43 and the $\overline{CLK}$ signal becomes equal to 1. The message length detector 46 is connected to the counter 45 and generates the signal $Y_5 = 1$ when the count of the counter 45 reaches the number of bit positions in a message. It should be noted that the detector 46 may consist merely of an AND gate whose inputs are selectively connected to the appropriate stages of the counter 45 such that the output of the AND gate equals 1 when the counter stores the desired count.

The counter 45 begins counting positive transitions of the $\overline{CLK}$ signal when the AND gate 44 is enabled by the signal M = 1. The counter 45 is reset when the signal $\overline{M} = 1$ is applied through the OR gate 51 to the reset input of the counter 45. Thus, whenever a message is being received, as indicated by the detection of the synchronization code in the shift register T, the flip-flop M assumes the set state and the signal M is equal to 1 until that entire message has been shifted out of the shift register T.

With the control circuit 15 (FIG. 6) in the control state 0010 (FIG. 7) the occurrence of the signal M = 1 produces a transition in the control circuit 15 (FIG. 6) to the control state 0110 (FIG. 7). This transition is accomplished by changing the state of the flip-flop B (FIG. 6F). More specifically, in the control state 0010 (FIG. 7) the flip-flop B is in the reset state and the signal B is equal to 0. It can be seen in FIG. 6F that the AND gate 78 has as its inputs the M signal together with the signals $\overline{A}$, $\overline{B}$, C, and $\overline{D}$. Thus, when the control circuit 15 (FIG. 6) is in the control state 0010 (FIG. 7) corresponding to the signals $\overline{A} = 1$, $\overline{B} = 1$, C = 1, and $\overline{D} = 1$ and the signal M becomes equal to 1, a 1 signal is generated at the output of AND gate 78 (FIG. 6F) and applied to the OR gate 90. In turn, the OR gate 90 generates a 1 signal which is applied to the S input of the flip-flop B. As a result, the flip-flop B changes from the reset to the set state and the B signal becomes equal to 1. Consequently, the control state of the control circuit 15 (FIG. 6) is changed to the control state 0110 (FIG. 7) wherein the flip-flop A (FIG. 6F) is in the reset state, the flip-flop B and the flip-flop C are in the set state, and, finally, the flip-flop D is in the reset state. Thus, as mentioned above, the four digit codes previously described as identifying the control states identify the states of the flip-flops A, B, C, and D, respectively. It is, again, these four flip-flops which determine the control state of the control circuit 15 (FIG. 6).

By the process above described, control circuit 15 has again returned to the control state 0110 (FIG. 7). The control circuit 15 (FIG. 6) remains in that control state until the flip-flop M (FIG. 6C) is reset, generating the signal $\overline{M} = 1$, in response to the generation by the message length detector 46 (FIG. 6C) of the signal $Y_5 = 1$. It will be recalled that the signal $Y_5 = 1$ indicates that the final bit of the message being received has been shifted out of the shift register T. When the signal $\overline{M} = 1$ is generated, the control circuit 15 (FIG. 6) again assumes the control state 0010 (FIG. 7). If, while in this state, the digital unit $D_i$ (FIG. 6D) generates either the signal SEND equal to 1 or the signal RCV equal to 1, indicating, respectively, that the digital unit $D_i$ has a message it wishes to transmit or that it is in the proper state to receive messages, the control circuit 15 (FIG. 6) assumes the control state 1010 (FIG. 7).

As should be apparent from the previous discussion, the transition from the control state 0010 to the control state 1010 requires only the setting of the flip-flop A (FIG. 6F). As a result, assuming for the moment that either the signal SEND or the signal RCV is equal to 1, the output of the OR gate 52 (FIG. 6E), to which both signals are applied, is equal to 1. This output is applied to the AND gate 73 (FIG. 6F) whose other inputs are respectively $\overline{A}$ equal to 1, $\overline{B}$ equal to 1, C equal to 1, and $\overline{D}$ equal to 1. As a result, the AND gate 73 generates a 1 signal which is applied to the S input of the flip-flop A, setting that flip-flop. The setting of the flip-flop A produces the control state 1010 (FIG. 7) as above described.

In the control state 1010, it can be seen in FIG. 5 that the gating signals $X_2$ and $X_7$ are equal to 1, all other gating signals being equal to 0. As a result, signals shifted through the shift register T (FIG. 6A) are applied, as previously described, to the input of the shift register V (FIG. 6B) and the output signals from the shift register V are applied, as previously described, to the transmission loop (FIG. 6B).

In the above discussion of the transition from the control state 0010 (FIG. 7) to the control state 1010, it was not important which of the two control signals generated by the digital unit $D_i$ (FIG. 6D), SEND and RCV, was equal to 1. In the state 1010, however, it is significant. It will first be assumed that the signal RCV is equal to 1 and the signal SEND is equal to 0. Under this assumption, as soon as the signal M becomes equal to 1, indicating that a synchronization code has been detected in the shift register T (FIG. 6A), the control circuit 15 (FIG. 6) assumes the control state 1011 (FIG. 7) by setting, in a manner similar to that previously described, the flip-flop D (FIG. 6F). In the control state 1011 (FIG. 7), as was the case for the control state 1010, the gating signals $X_2$ and $X_7$ (FIG. 5) are equal to 1. Thus, the received message signals are gated to the input of the shift register V (FIG. 6B) and the signals at the output of the shift register V are gated to the transmission loop.

In addition, in the control state 1011 (FIG. 7) with the signals A = 1, C = 1, D = 1, and M = 1 applied to the AND gate 55 (FIG. 6E), a 1 signal appears at the output of the AND gate 55 following each positive transition of the clock signal $\overline{CLK}$. This 1 signal is applied through the OR gate 59 to the input of the counter 60. Consequently, the counter 60 counts each pulse of the signal $\overline{CLK}$ occurring after entry of the control circuit 15 (FIG. 6) into the control state 1011 (FIG. 7) as long as the signal M remains equal to 1. The register length detector 65 (FIG. 6E) is connected to the outputs of the counter 60 and generates a 1 signal at its output when the count in the counter 60 reaches the number of stages in the register V. The detector 65 may be an AND gate with inputs connected to the appropriate stages of the counter 60 such that a 1 signal is generated only for the appropriate count by the counter 60.

The occurrence of the 1 signal at the output of the detector 65 is used by the control circuit 15 (FIG. 6) to indicate that all of the bits in the destination code field 32 (FIG. 3) of the message being received have been shifted into the register V (FIG. 6B). This 1 signal generated by the detector 65 (FIG. 6E) is applied to the AND gate 70, the other input of which is driven by the signal RC from the node terminal destination code detector 20 (FIG. 6D). It will be recalled that the signal RC is equal to 1 when the detector 20 which is connected to the shift register V (FIG. 6B) detects signals representing the terminal code for the node terminal $N_i$ (FIG. 6). Thus, when the signal RC is equal to 1 simultaneously with the output of the detector 65 (FIG. 6E) being equal to 1, the signal $Y_2$, which is the output signal of the AND gate 70 is equal to 1.

It can be seen in FIG. 7 that upon the occurrence of the signal $Y_2$ equal to 1 when the control circuit 15 (FIG. 6) is in the control state 1011 (FIG. 7), the control circuit 15 (FIG. 6) assumes the transitional control state 0011. From the previous discussion of the mechanism of changing control states, it should be apparent that all that is required to accomplish this change of control states in view of the current control state of the control circuit 15 (FIG. 6) is to reset the previously set flip-flop A. Having reached the control state 0011 (FIG. 7), however, it should also be noted that the occurrence of the signal $Y_2$ equal to 1 when the control circuit 15 (FIG. 6) is in the control state 0011 (FIG. 7) produces a transition for the control circuit 15 (FIG. 6) to the control state 0111 (FIG. 7). Thus, it should be noted that the control state 0011 is merely a transitional control state used to properly time events in the control circuit 15 (FIG. 6). In the control state 0111 (FIG. 7) in which the flip-flop A (FIG. 6F) is in the reset state and the flip-flops B, C, and D are all in the set state, the gating signals $X_3$ and $X_9$ are equal to 1 (FIG. 5), all other gating signals being equal to 0. Thus, as previously described, signals appearing at the output of the shift register T (FIG. 6A) are gated to the input of the shift register W (FIG. 6B) and signals appearing at the output of the shift register W are gated to the transmission loop.

It should be noted from the above that the transition from the state 1011 (FIG. 7), ultimately to the control state 0111, was effected after the complete destination code field 32 (FIG. 3) of the incoming message had been stored in the shift register V (FIG. 6B) and the destination code so stored had been recognized to be the terminal code for the node terminal $N_i$ (FIG. 6). It is now necessary to return briefly to the consideration of the control state 1011 (FIG. 7) to consider the case wherein the destination code stored in the shift register V (FIG. 6B) is not the code for the terminal $N_i$ (FIG. 6). Specifically, it should be noted that if the destination code stored in the shift register V (FIG. 6B) is not that of the node terminal $N_i$ (FIG. 6), the signal RC equal to 1 is not generated simultaneously with the generation of the output 1 signal from the register length detector 65 (FIG. 6C). Thus, the signal $Y_2$ equal to 1 is not generated. As a result, the incoming message continues to be shifted through the shift register T (FIG. 6A) and through the shift register V (FIG. 6B) and back out onto the transmission loop.

More specifically, the control state 1011 is maintained under these conditions until the entire received message has been shifted out of the shift register T (FIG. 6A) and the shift register V (FIG. 6B) has been emptied. It will be recalled that the message length detector 46 (FIG. 6C) generates the $Y_5 = 1$ signal, previously described, when a received message has been shifted out of the register T (FIG. 6A). In addition, as a result of the generation of the signal $Y_5 = 1$, the flip-flop M is subsequently reset and the signal $\overline{M} = 1$ is generated. With the occurrence of the signal $\overline{M} = 1$, the counter 60 (FIG. 6E) is reset by the application of the signal $\overline{M} = 1$ to the reset input of the counter 60 through the OR gate 61. In addition, however, the AND gate 58, to which the $\overline{M} = 1$ signal is applied along with the signals A, $\overline{B}$, C, and D which are currently all equal to 1, generates a 1 signal following the occurrence of each positive transition of the clock signal $\overline{CLK}$. This 1 signal is applied through the OR gate 62 to the counter 63. As a result, the counter 63 begins to count the pulses of the clock signal $\overline{CLK}$. The register length detector 69 is connected to the outputs of the counter 63. When the counter 63 reaches a count indicating that a sufficient number of clock cycles have occurred since the occurrence of signal $\overline{M}$ equal to 1 such that the shift register V (FIG. 6B) should be empty, the detector 69 (FIG. 6E) generates the signal $Y_1$ equal to 1. This signal is used in a manner similar to that used to produce the previous control state transitions to produce the transition of the control circuit 15 (FIG. 6) from the control state 1011 (FIG. 7) to the control state 1010.

If, when the control circuit 15 (FIG. 6) assumes the control state 1010 (FIG. 7), the digital unit $D_i$ (FIG. 6D) is still generating the signal RCV equal to 1, the control circuit 15 (FIG. 6) again assumes the control state 1011 (FIG. 7) with the next occurrence of the signal M = 1 as above described. The discussion of the effect of the generation of the signal SEND equal to 1 by the digital unit $D_i$ (FIG. 6D) will be presented below.

Returning now to the discussion of the control state 0111 (FIG. 7), it will be recalled that this state is entered from the transition state 0011 after the destination code field 32 (FIG. 3) of a message intended for the node terminal $N_i$ (FIG. 6) is received and stored in the shift register V (FIG. 6B). In the control state 0111 (FIG. 7) the signals shifted to the output of the register T (FIG. 6A) are applied, as above described, to the input of the shift register W (FIG. 6B) for the purpose of receiving the source code field 33 (FIG. 3) of the message being received.

Upon entering the control state 0111 (FIG. 7), the signal M is still equal to 1 and the signals $\overline{A}$, B, C, and D (FIG. 6F) are all equal to 1. As a result, the AND gate 54 (FIG. 6E) produces a 1 signal following each positive transition of the clock signal $\overline{CLK}$ and applies that signal through the OR gate 59 to the input of the counter 60. It will be recalled from the above discussion that the counter 60 counted the clock pulses occurring while the control circuit 15 (FIG. 6) was in the control state 1011 (FIG. 7) and the bits of the received message were being shifted into the shift register V (FIG. 6B). Therefore, at the point of entry into the control state 0111 (FIG. 7) the count in the counter 60 (FIG. 6E) is equal to the number of bit positions in the shift register V and is, thus, equal to the number of bit positions in the combined fields 32 and 31 (FIG. 3) of the message currently being received. As a result of the clock pulse signals appearing at the output of the AND gate 54 (FIG. 6E), the counter 60 continues its count of the clock pulses occurring while the control circuit 15 (FIG. 6) is in the control state 0111 (FIG. 7).

It should be noted that the register length detector 67 (FIG. 6E) is connected to the outputs of the counter 60. When the counter 60 reaches a count equal to the number of bit positions in both the V and W registers (FIG. 6B), the signal $Y_7 = 1$ is generated by the detector 67 (FIG. 6E), indicating that the entire source code field has been received and stored in the register W (FIG. 6B). In response to the signal $Y_7 = 1$, the control circuit 15 (FIG. 6) assumes the control state 0101 (FIG. 7). From the previous discussion it should be apparent that the transition from the 0111 control state to the 0101 control state requires merely the resetting of the flip-flop C (FIG. 6F). The flip-flop C is reset by a 1 signal generated by the AND gate 83 and applied through the OR gate 93 to the R input of the flip-flop C.

It will be recalled that when the 0101 (FIG. 7) control state is assumed by the control circuit 15 (FIG. 6), the shift register V (FIG. 6B) currently stores the fields 31 and 32 (FIG. 3) of the message being received and the shift register W currently stores the field 33 of the message being received. In FIG. 5 it can be seen that in the 0101 control state, the gating signal $X_1$ is equal to 1, all other gating signals being equal to 0. As a result, signals appearing at the output of shift register T (FIG. 6A) are, as previously described, gated to the input of the shift register U. It will be recalled that the shift register U is used to receive and store the data field 34 (FIG. 3) of the message being received. Since, previously, the fields 31, 32, and 33 have already been received and stored, the data field 34 is the only message field remaining to be received and stored for the incoming message. Therefore, completion of the reception and storage of the data field 34 in the shift register U (FIG. 6A) occurs contemporaneously with the completion of the reception of the message itself. It will be recalled that the generation of the signal $Y_5 = 1$ by the message length detector 46 (FIG. 6C) indicates that an entire message has been shifted out of the shift register T (FIG. 6A). Therefore, it is assumed that upon the occurrence of the signal $Y_5 = 1$, the complete data field 34 (FIG. 3) has been received and stored in the shift register U (FIG. 6A).

Consequently, in response to the occurrence of the signal $Y_5 = 1$, the flip-flop D (FIG. 6F) is reset by a signal from the AND gate 87 and the control circuit 15 (FIG. 6) assumes the transitional control state 0100 (FIG. 7). Immediately thereafter, the flip-flop C (FIG. 6F) is set by a signal from the AND gate 81 and the control circuit 15 (FIG. 6) assumes the previously discussed control state 0110 (FIG. 7). It should be noted further that, upon the occurrence of the signal $Y_5 = 1$, the digital unit $D_i$ (FIG. 6) is signalled by the application of the $Y_5 = 1$ signal to its RECM (receive message) input that a message has been received and should be accessed in the respective shift registers by the digital unit $D_i$ (FIG. 6D).

In the above it has been shown that in response to the receive signal RCV = 1 from the digital unit $D_i$ (FIG. 6D), a sequence of control states is assumed by the control circuit 15 (FIG. 6) such that any incoming messages, both messages intended for and messages not intended for the node terminal $N_i$ (FIG. 6), are received and appropriately processed. More specifically, if the received messages are not intended for the node terminal $N_i$, they are shifted through the register T (FIG. 6A) and the register V (FIG. 6B) and applied to the transmission loop for transmission to the node terminal $N_{i+1}$ (FIG. 2). If, however, the received messages are intended for the node terminal $N_i$ (FIG. 6), each such message is appropriately shifted into the shift registers U, V, and W and supplied to the digital unit $D_i$ (FIG. 6D).

In the above discussion it was noted that the control state assumed in response to the signal SEND = 1 from the digital unit $D_i$ (FIG. 6D) while the control circuit 15 (FIG. 6) is in the control state 1010 (FIG. 7) is not the same as the control state assumed if the signal RCV = 1 (FIG. 6D) is generated by the digital unit $D_i$. More specifically, when the control circuit 15 (FIG. 6) is in the control state 1010 (FIG. 7), the occurrence of the signal SEND = 1 prior to the occurrence of the signal M = 1 produces a transition to the control state 1110 (FIG. 7). Simultaneously, the message from the digital unit $D_i$ (FIG. 6D) which is to be transmitted to another node terminal N (FIG. 1) is loaded into the shift registers U, V, and W (FIG. 6).

By way of further explanation, the transition from the control state 1010 (FIG. 7) to the control state 1110 requires merely the setting of the flip-flop B (FIG. 6F). Referring to FIG. 6F, the signal SEND = 1 applied to the AND gate 77 simultaneously with the signals A = 1, $\bar{B} = 1$, C = 1, and $\bar{D} = 1$ produces a 1 signal at the output of the AND gate 77. This signal is applied through the OR gate 90 to the S input of the flip-flop B, thereby setting that flip-flop. Thus, the control circuit 15 (FIG. 6) transitions to the control state 1110 (FIG. 7).

In addition, it should be noted that each of the shift registers U, V, and W are connected by lines 120 (FIG. 6A), 121 (FIG. 6B) and 122, respectively, to the digital unit $D_i$ (FIG. 6D). When the SEND = 1 signal is generated by the digital unit $D_i$, the data signals comprising the message to be sent are applied by the digital unit $D_i$ to the aforementioned lines connected to the respective shift registers. More specifically, the data signals of the destination code field 32 (FIG. 3) are applied to lines 122 (FIG. 6B) connected to the shift register W and the data signals of the source code for the source code field 33 (FIG. 3) are applied to lines 121 (FIG. 6B) connected to the shift register V. Finally, the data signals of the data field 34 (FIG. 3) of the message to be transmitted are applied to lines 120 (FIG. 6A) connected to the shift register U.

When the control circuit 15 (FIG. 6) assumes the control state 1110 (FIG. 7), as above described, the signal $X_5$ equal to 1 is generated. This signal is applied to the G inputs of the shift registers U (FIG. 6A), V (FIG. 6B), and W, respectively. The application of this signal to these inputs results in the loading of the data signals appearing on the lines 120 (FIG. 6A), 121 (FIG. 6B), and 122 into the shift registers U (FIG. 6A), V (FIG. 6B) and W, respectively. In addition, in the case of the shift register W it should be noted that the occurrence of the signal $X_5 = 1$ also loads the signals on the lines 123 from the synchronization code memory 127 into the register W. It should be noted that the synchronization code memory 127 may consist of merely connections of the lines 123 to 0 and 1 signals appropriately to represent the message synchronization code.

Therefore, after entry into the state 1110 (FIG. 7) registers U (FIG. 6A), V (FIG. 6B), and W contain a complete message ready for transmission to another node terminal N (FIG. 1). Transmission of that message begins with the immediately succeeding positive transition of the clock signal CLK which shifts the first bit of the synchronization code out as previously described through the enabled AND gate $A_9$ (FIG. 6B) and the OR gate 27 to the cable driver 28.

If, during the transmission of the message loaded into the registers U (FIG. 6A), V (FIG. 6B) and W, no message is received by the node terminal $N_i$ (FIG. 6) before a sufficient number of bits of the message have been transmitted such that the register U (FIG. 6A) is empty, the signal $Y_4 = 1$ (FIG. 6E) is generated. More specifically, the $\overline{M} = 1$ signal, indicating that no message is being received, is applied to the AND gate 57 (FIG. 6E) simultaneously with the signals A = 1, B = 1, C = 1, and $\overline{D} = 1$. As a result, a 1 signal pulse is generated at the output of the AND gate 57 following each positive transition of the clock signal $\overline{CLK}$. The 1 signal pulses generated at the output of the AND gate 57 are applied through the OR gate 62 to the counter 63. The register length detector 68 is connected to the outputs of the counter 63. When the counter 63 reaches a count equal to the number of register stages in the register U (FIG. 6A), indicating that all of the bits of the message to be transmitted have been shifted out of the register U, the counter 63 (FIG. 6E) generates the signal $Y_4$ equal to 1. It should be noted, however, that whenever the signal M = 1 is generated, indicating a message is being received by the node terminal $N_i$ (FIG. 6), the counter 63 (FIG. 6E) is reset by the application of the signal M = 1 to the reset input of the counter 63 through the OR gate 64. Therefore, if during the time necessary to shift out all of the message bits stored in the register U (FIG. 6A), the signal M = 1 is not generated, the signal $Y_4 = 1$ is generated. The signal $Y_4 = 1$ is applied to the AND gate 85 (FIG. 6F) along with the signals A = 1, B = 1, C = 1, and $\overline{D} = 1$ producing a 1 signal at the output of the AND gate 85 which is applied to the S input of the flip-flop D. Thus, the control state 1111 (FIG. 7) is assumed by the control circuit 15 (FIG. 6).

When the control state 1111 (FIG. 7) is assumed, the gating signals $X_2$, $X_6$, and $X_9$ are equal to 1 (FIG. 5), all other gating signals being equal to 0. As a result, and as described previously, signals shifted to the output of the register T (FIG. 6A) are applied to the input of the register V (FIG. 6B) and signals shifted to the output of the register V are applied to the input of the register W. Finally, the signals shifted to the output of the register W are applied to the transmission loop (FIG. 6B).

If, while in the state 1111 (FIG. 7), no message is received, the remaining data bits of the message to be transmitted are shifted from the registers V and W (FIG. 6B) and transmitted on the transmission loop. Thereafter, the control state 1011 (FIG. 7) is assumed by the control circuit 15 (FIG. 6). If, however, a message is received during the transmission of the message and the received message is not intended for the node terminal $N_i$ (FIG. 6), the control state 1111 (FIG. 7) is maintained by the control circuit 15 (FIG. 6) until that entire message has been received and shifted out of the node terminal $N_i$ (FIG. 6). In either event, however, the signal $Y_6 = 1$ must be generated for the control state 1111 (FIG. 7) to be changed to the control state 1011.

The control signal $Y_6$ equal to 1 is generated by the register length detector 49 (FIG. 6C) which is connected to the counter 47. The counter 47 counts pulses appearing at the output of the AND gate 48. The inputs to the AND gate 48 consist of the signals $\overline{M}$, A, B, C, and D and the clock signal $\overline{CLK}$. In addition, the OR gate 50 which drives the reset input of the counter 47 is responsive to the M signal. Therefore, if at any time the signal M = 1 is generated, the counter 47 is reset.

In operation, after the transition from the control state 1110 (FIG. 7) to the control state 1111 has occurred, the AND gate 48 (FIG. 6C) produces output 1 signal pulses following each positive transition of the clock signal $\overline{CLK}$ as long as the signal $\overline{M}$ is equal to 1. Therefore, if no message is received before the counter 47 reaches a count equivalent to the number of stages in the registers V and W (FIG. 6B) the register length detector 49 (FIG. 6C) generates the signal $Y_6$ equal to 1. This signal is applied to the AND gate 79 (FIG. 6F) to which the signals A, B, C, and D all equal to 1 are also applied. As a result, a 1 signal is generated by the AND gate 79 and is applied through the OR gate 91 to the R input of the flip-flop B. Thus, the flip-flop B is reset and circuit 15 (FIG. 6) assumes the control state 1011 (FIG. 7).

If, however, the signal M = 1 is generated in response to the reception of a message before the signal $Y_6 = 1$ is generated, the counter 47 (FIG. 6C) is reset and its count of clock pulses does not resume until the signal $\overline{M} = 1$ is generated again. It will be recalled, however, that the signal $\overline{M} = 1$ is generated only after an entire received message has been shifted through the register T. Therefore, at the point when the signal $\overline{M} = 1$ is generated, the last bit of the received message has been shifted into the register V (FIG. 6B) and must be shifted through the entire register V and the entire register W to ensure the transmission of the full received message to the next node terminal on the transmission loop. It should be noted, however, that, as before described, the signal $Y_6 = 1$ is not generated until a number of clock pulses equal to the number of stages in the registers V and W (FIG. 6B) combined have been generated after the occurrence of the signal $\overline{M}$ equal to 1. As a result, it is not until the entire received message has been shifted through the registers V and W that the signal $Y_6 = 1$ is generated and the control state 1011 (FIG. 7) is assumed by the control circuit 15 (FIG. 6).

It is possible, however, that while in the control state 1111 (FIG. 7) a message will be received which is intended for the node terminal $N_i$ (FIG. 6). If that be the case, the message must be received and stored in the respective shift registers for use by the digital unit $D_i$ (FIG. 6D). As a result, the occurrence of the previously discussed signal $Y_2 = 1$, indicating that the destination for the received message is the terminal $N_i$ (FIG. 6), while the message bits remaining in the register W are being shifted out, produces a transition of the control circuit 15 (FIG. 6) to the control state 0111 (FIG. 7).

More specifically, it will be recalled that the AND gate 55 (FIG. 6E) is enabled to generate 1 signal pulses in accordance with the pulses comprising the signal $\overline{CLK}$ when, as here, the signals M = 1, A = 1, C = 1, and D = 1, control state 1111 are applied to its inputs. The pulses appearing at the output of the AND gate 55 are applied through the OR gate 59 to the counter 60. As was mentioned earlier, the register length detector 65 generates a 1 signal at its output when the counter 60 reaches a count equivalent to the number of register stages in the register V (FIG. 6B). The signal $Y_2 = 1$ is generated when the 1 signal from the register length detector 65 (FIG. 6E) occurs simultaneously with the signal RC = 1 from the node terminal destination code detector 20 (FIG. 6D). This $Y_2 = 1$ signal is applied to the AND gate 74 (FIG. 6F) along with the signals A = C = D = 1. The AND gate 74, therefore, generates a 1 signal which is applied through the OR gate 89 to the R input of the flip-flop A. Thus, the control state of the control circuit 15 (FIG. 6) becomes the control state 0111 (FIG. 7).

In this new control state, not only is the source code field 33 (FIG. 3) of the message being received collected in the shift register W (FIG. 6B) as previously described, but in addition, the remaining portion of the message being transmitted is shifted out of the shift register W as the source code field 33 (FIG. 3) of the incoming message is shifted into the shift register W (FIG. 6B). Therefore, both the transmission of the full message previously being transmitted and the reception of the source code field 33 (FIG. 3) of the message being received is ensured. Thereafter, the remainder of the message is received as previously discussed.

In the above it has been seen that the control circuit 15 (FIG. 6) is capable of recognizing the request of the digital unit $D_i$ (FIG. 6D) that a message be transmitted to another node terminal N (FIG. 1). Moreover, the control circuit 15 (FIG. 6) is capable of controlling the transmission of that message while messages, which are both intended for and not intended for the node terminal $N_i$ (FIG. 6F), are received. One control state, however, remains to be discussed. More specifically, it will be recalled that the transition to the control state 1111 (FIG. 7) from the control state 1110 occurs only if the register U (FIG. 6A) becomes, in fact, empty. If, however, before the register U becomes empty by shifting the data field 34 (FIG. 3) of the message to be transmitted into the register V (FIG. 6B) a message is received which is intended for the node terminal $N_i$ (FIG. 6), the control state 1100 (FIG. 7) is assumed by the control circuit 15 (FIG. 6).

More specifically, in the control state 1110 (FIG. 7), after the occurrence of signal M = 1, indicating the reception of a message, the AND gate 56 (FIG. 6E) to which the signals M = 1, A = 1, B = 1, C = 1, and $\overline{D} = 1$ are applied, generates 1 signal pulses corresponding to the pulses of the clock signal $\overline{CLK}$. These are applied through the OR gate 59 to the previously discussed counter 60. The register length detector 66 is connected to the counter 60 and generates a 1 signal at its output when the count reached by the counter 60 is equivalent to the total number of stages in the registers U and V (FIG. 6A, 6B), respectively. This 1 signal is applied to the AND gate 71 (FIG. 6E) whose other input is driven by the signal RC from the node terminal destination code detector 20 (FIG. 6D). Thus, when the first bit of the message being received is shifted through the register U (FIG. 6A) to the last stage of the register V (FIG. 6B), as indicated by the occurrence of the 1 signal at the output of the detector 66 (FIG. 6E), the destination code field 32 (FIG. 3) of the message being received is stored in the register V (FIG. 6B). If, at that time, the node terminal destination code detector 20 (FIG. 6D) generates the signal RC = 1 (FIG. 6F), the AND gate 71 (FIG. 6E) generates the signal $Y_3 = 1$. This signal is applied to the AND gate 82 (FIG. 6F) together with the signals A = B = C = $\overline{D}$ = 1. The AND gate 82 generates a 1 signal which is applied through the OR gate 93 to the R input of the flip-flop C. As a result, the flip-flop C is reset and the control state 1100 (FIG. 7) is assumed by the control circuit 15 (FIG. 6).

Upon entry into the control state 1100 (FIG. 7) the destination code field 32 (FIG. 3) of the message being received has already been stored in the shift register V (FIG. 6B) and only the source code field 33 (FIG. 3) and the date field 34 need be received and stored in the shift registers W (FIG. 6B) and U (FIG. 6A), respectively. As a result, in the control state 1100 (FIG. 5), the gating signals $X_1$, $X_8$, and $X_9$ are equal to 1, all other gating signals being equal to 0. Consequently, signals appearing at the output of register T (FIG. 6A) are, as previously described, applied to the input of the register U and signals appearing at the output of the shift register U are applied to the input of the shift register W (FIG. 6B). Finally, to ensure that any message previously being transmitted is completely transmitted, signals appearing at the output of the shift register W are applied through the AND gate $A_9$ and the OR gate 27 to the cable driver 28.

Again, as in the case of the control state 0101 (FIG. 7) previously discussed, the remainder of the received message is to be collected without an additional change in control state. Therefore, when the signal $Y_5$ equal to 1 occurs, indicating that the full message length has been counted by the counter 45 (FIG. 6C), the control circuit 15 (FIG. 6) assumes the transitional control state 0100 (FIG. 7) and, thereafter, the control state 0110. It should also be noted that the signal $Y_5 = 1$ applied to the RECM input of the digital unit $D_i$ (FIG. 6D) signals the digital unit $D_i$ of the availability in the shift registers U and W of a message for its use.

In the above discussion repeated reference has been made to the cable driver 28 (FIG. 6B). The cable driver 28 is not important to this invention and any of many known in the prior art would suffice. The particular cable driver 28 shown in FIG. 6B employs an AND gate 129, a delay circuit 128, and an impedance matcher 130. The signals appearing at the output of the OR gate 27 are applied to one input of the AND gate 129. The other input of the gate 129 is driven by the output of the delay circuit 128 which delays the clock signal CLK by an amount approximating one quarter of the average expected clock period. It should be recalled that signals are shifted into the shift registers T (FIG. 6A), U, V (FIG. 6B), and W by the positive transition of the CLK signal and that events in the control circuit 15 are governed by the signal $\overline{CLK}$ which is, effectively, a one-eighth clock period delayed version of the signal CLK. Thus, when the delayed clock signals appearing at the output of the delay circuit 128 enable the AND gate 129 to respond to signals appearing at the output of OR gate 27, all shifting and control operations should be complete. The signals appearing at the output of AND gate 129 are applied to impedance matcher 130 and from there to the transmission loop.

The above discussion has disclosed in detail an illustrative embodiment of this invention. It is believed that many alternative embodiments of this invention equally within its spirit and scope will become apparent to those skilled in the art upon reading this specification. For example, it would be obvious to one skilled in the art that, with appropriate changes in the control circuit 15 (FIG. 2), the node terminal destination code detector 20 could be connected to receive signals from the register T rather than the register U. Under certain conditions such a change, with the addition of the ability to bypass selected stages of the register U, would result in a further reduction in the delay of messages not intended for the receiving node terminal. In addition, it would be obvious to one skilled in the art to employ a variable length data field in the transmitted messages. To employ such a variable length data field, a message length field, following the synchronization code field and specifying the length of the particular message, would be required in each message. In addition, a variable length U register would be required with a selected length dependent upon the code detected in the message length field for each message.

What is claimed is:

1. In a transmission arrangement for transmitting messages between a plurality of transmission node terminals, wherein each message comprises a first field of a first number of bits, a second field of a second number of bits, and a third field of a third number of bits equal to the sum of said first and second number of bits, a transmission node terminal, having an input port and an output port, comprising:

a clock signal generator;

a first shift register, connected to said clock signal generator, comprising a serial input terminal, a serial output terminal, and a number of register stages equal to said first number of bits;

means for connecting said input port to said serial input terminal of said first shift register;

a second shift register, connected to said clock signal generator, comprising a serial input terminal, a serial output terminal, and a number of register stages equal to said third number of bits;

means connected to said serial output terminal of said first shift register for gating signals to said input terminal of said second shift register;

means connected to said serial output terminal of said first shift register for gating signals to said output port;

means connected to said serial output terminal of said second shift register for gating signal to said output port;

a third shift register, connected to said clock signal generator, comprising a serial input terminal, a serial output terminal, and a number of register stages equal to said third number of bits;

means connected to said serial output terminal of said first shift register for gating signals to said input terminal of said third shift register;

means connected to said serial output terminal of said third shift register for gating signals of said output port;

a fourth shift register connected to said clock signal generator comprising a serial input terminal, a serial output terminal, and at least one register stage;

means connected to said serial output terminal of said first shift register for gating signals to said input terminal of said fourth shift register;

means connected to said serial output terminal of said fourth shift register for gating signals to the input terminal of said second shift register;

means connected to said serial output terminal of said fourth shift register for gating signals to said input terminal of said third shift register; and means connected to said serial output terminal of said second shift register for gating signals to said input terminal of said third shift register.

2. In a transmission arrangement for serially communicating digital messages each comprising a destination address portion, a source address portion, and a data portion between a plurality of transmission terminals serially connected in a transmission loop, a transmission terminal having a unique identification code comprising:

an input port;

an output port;

a first serial storage means comprising a serial input terminal and a serial output terminal;

means for connecting said serial input terminal of said first storage means to said input port;

a second serial storage means, having less storage capacity than required to store an entire one of said digital messages, comprising a serial input terminal and a serial output terminal;

first gating means for gating signals from the output terminal of said first serial storage means to the input terminal of said second storage means;

detector means responsive to signals stored in said second serial storage means for generating local destination code control signals indicating that the destination address of a received message is the unique identification code of the respective transmission terminal;

second gating means connected to said serial output terminal of said second storage means for gating signals to said output port;

serial information storage means having sufficient capacity to store the source address portion and data portion of a digital message;

means responsive to said local destination code control signals for inhibiting said first gating means from gating signals to said second serial storage means and for inhibiting said second gating means from gating signals to said output port;

third gating means responsive to said local destination code control signals for gating signals from the output terminal of said first storage means to said serial information storage means.

3. A transmission terminal in accordance with claim 2 wherein said serial information storage means further comprises a third serial storage means and a fourth serial storage means; and wherein said third gating means further comprises means for gating the source address portion of a received data message from the output terminal of said first serial storage means to said third storage means and means for gating the data portion of said received digital message from the output terminal of said first serial storage means to said fourth serial storage means.

4. The transmission terminal in accordance with claim 3 further comprising:

counting means connected to said input port for counting the digits of a received digital message and for generating count signals indicating the number of digits received;

means responsive to said count signals for generating completed message signals indicating that a completed one of said digital messages has been received by said transmission terminal;

means responsive to said completed message signals for gating signals from the output terminal of said first serial storage means to said output port; and means for inhibiting the generation of said completed message signals.

5. The terminal of claim 3 further comprising means connected to said serial output terminal of said second serial storage means for gating signals to said third serial storage means.

6. The terminal of claim 5 further comprising means for gating signals from said third serial storage means to said output port; and means for gating signals from said first serial storage means to said output port.

7. The terminal of claim 6 further comprising:

means for gating signals from said fourth serial storage means to said input terminal of said second serial storage means.

8. The terminal of claim 7 further comprising means for gating signals from said fourth serial storage means to said third serial storage means.

* * * * *